(12) United States Patent
Ono et al.

(10) Patent No.: US 11,325,549 B2
(45) Date of Patent: May 10, 2022

(54) ARBITRATION DEVICE FOR ARBITRATING PLURAL POWER LOADS IN VEHICLE

(71) Applicant: TOYOTA JIDOSHA KABUSHIKI KAISHA, Toyota (JP)

(72) Inventors: Toru Ono, Toyota (JP); Akira Umemoto, Nagakute (JP); Takuya Itoh, Toyota (JP); Tomoyuki Kato, Miyoshi (JP); Makoto Fujii, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 16/722,828

(22) Filed: Dec. 20, 2019

(65) Prior Publication Data

US 2020/0254946 A1 Aug. 13, 2020

(30) Foreign Application Priority Data

Feb. 13, 2019 (JP) .............................. JP2019-023910

(51) Int. Cl.
*B60R 16/03* (2006.01)
*G06F 1/26* (2006.01)

(52) U.S. Cl.
CPC .............. *B60R 16/03* (2013.01); *G06F 1/266* (2013.01)

(58) Field of Classification Search
CPC ........ B60R 16/03; G06F 1/266; G06F 1/3206
USPC ....................................................... 700/297
See application file for complete search history.

(56) References Cited

U.S. PATENT DOCUMENTS

| 9,703,339 B2* | 7/2017 | Kulyk | G06F 1/26 |
| 10,166,938 B2* | 1/2019 | Kinoshita | H02J 1/10 |
| 2008/0073975 A1* | 3/2008 | Wight | G06F 13/385 |
| | | | 307/32 |
| 2009/0070604 A1 | 3/2009 | Kumakura | |
| 2011/0064126 A1* | 3/2011 | Ishiko | H04B 3/544 |
| | | | 375/222 |
| 2015/0005978 A1* | 1/2015 | Nakakita | H02J 13/00034 |
| | | | 700/297 |
| 2016/0185292 A1 | 6/2016 | Asai | |
| 2017/0166145 A1* | 6/2017 | Kinoshita | F02P 7/077 |

(Continued)

FOREIGN PATENT DOCUMENTS

| JP | 2007-161016 A | 6/2007 |
| JP | 2009-065408 A | 3/2009 |

(Continued)

*Primary Examiner* — Chun Cao
(74) *Attorney, Agent, or Firm* — Oliff PLC

(57) ABSTRACT

There is provided an arbitration device that arbitrates operation requests from a plurality of first power loads in a vehicle, the arbitration device including: a reception section; a memory section; a calculation section that calculates a total power consumption combining the first power consumption and the second power consumption; and a control section at which priorities of the plurality of first power loads are specified, when the total power consumption exceeds a threshold, the control section selecting which of the first power loads to approve based on the priorities and causing each operating first power load that is not approved to pause operation, and, when the total power consumption is less than or equal to the threshold, the control section allowing each operating first power load to continue operation.

5 Claims, 16 Drawing Sheets

(56) References Cited

U.S. PATENT DOCUMENTS

2018/0141438 A1* 5/2018 Sakai .................. B60L 1/00
2021/0189877 A1* 6/2021 Lewis ............... G06Q 30/0605

FOREIGN PATENT DOCUMENTS

| JP | 2013-123317 A | 6/2013 |
| JP | 2016-124391 A | 7/2016 |

* cited by examiner

FIG.4

| CLASS | RANK | PRIORITY | PAUSE DURATION | OPERATION DECISION |
|---|---|---|---|---|
| SHORT-TERM LARGE POWER LOAD | | | | |
| LONG-TERM LARGE POWER LOAD | B | 2 | T2 | PAUSE |
| SMALL POWER LOAD | A | 1 | T1 | CONTINUE |

FIG.10

| CLASS | RANK | PRIORITY | PAUSE DURATION | OPERATION DECISION | RESTART PRIORITY |
|---|---|---|---|---|---|
| SHORT-TERM LARGE POWER LOAD A | | | | | |
| SHORT-TERM LARGE POWER LOAD B | | | | | |
| LONG-TERM LARGE POWER LOAD C | C | 3 | T3 | CONTINUE | |
| LONG-TERM LARGE POWER LOAD D | D | 4 | T4 | PAUSE | 1 |
| LONG-TERM LARGE POWER LOAD E | E | 5 | T5 | PAUSE | 2 |
| SMALL POWER LOAD F | A | 1 | T1 | CONTINUE | |
| SMALL POWER LOAD G | B | 2 | T2 | CONTINUE | |

FIG.13

| CLASS | RANK | SPECIFIED PRIORITY | MODIFIED PRIORITY | SPECIFIED PAUSE DURATION | MODIFIED PAUSE DURATION | OPERATION DURATION | OPERATION DECISION | RESTART PRIORITY |
|---|---|---|---|---|---|---|---|---|
| SHORT-TERM LARGE POWER LOAD A | | | | | | | | |
| SHORT-TERM LARGE POWER LOAD B | | | | | | | | |
| LONG-TERM LARGE POWER LOAD C | C | 3 | 5 | T3 | T5 | Te | PAUSE | 2 |
| LONG-TERM LARGE POWER LOAD D | D | 4 | 3 | T4 | T3 | Tc | CONTINUE | |
| LONG-TERM LARGE POWER LOAD E | E | 5 | 4 | T5 | T4 | Td | PAUSE | 1 |
| SMALL POWER LOAD F | A | 1 | 1 | T1 | T1 | Ta | CONTINUE | |
| SMALL POWER LOAD G | B | 2 | 2 | T2 | T2 | Tb | CONTINUE | |

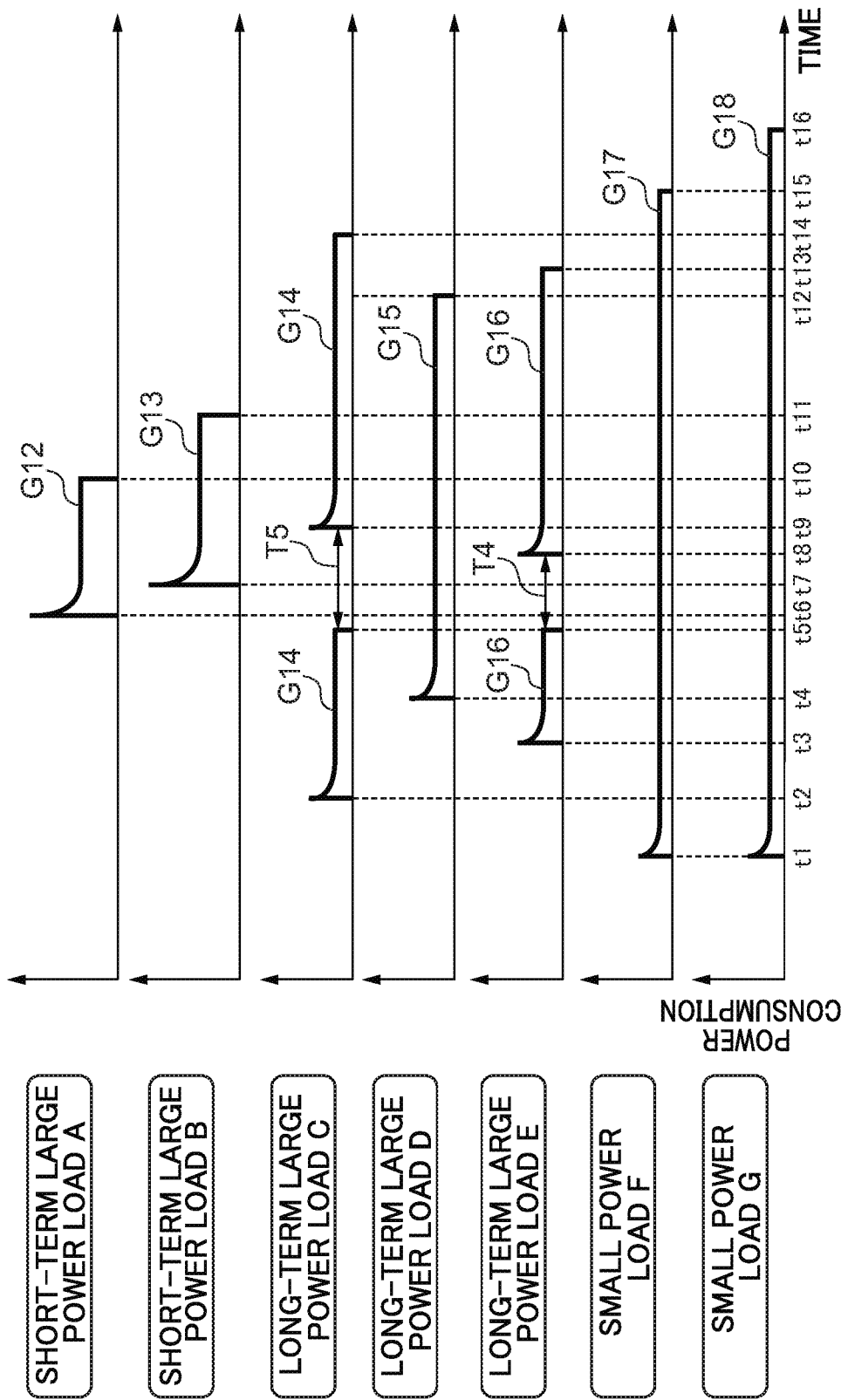

ARBITRATION DEVICE FOR ARBITRATING PLURAL POWER LOADS IN VEHICLE

CROSS-REFERENCE TO RELATED APPLICATION

This application is based on and claims priority under 35 USC 119 from Japanese Patent Application No. 2019-023910 filed on Feb. 13, 2019, the disclosure of which is incorporated by reference herein.

BACKGROUND

Technical Field

The present disclosure relates to an arbitration device.

Related Art

Japanese Patent Application Laid-Open (JP-A) No. 2016-124391 discloses an electric power supply system that, if a preceding power load is launching when launch permission request signals are received, waits until the preceding launch is complete before providing the launch permission. However, a delay-prohibited power load is allowed to launch immediately without receiving a permission.

A vehicle includes plural first power loads that operate when operation requests are approved, at least one second power load that operates regardless of approval, and a power supply. In a state of this vehicle in which first power loads are already operating, operations of the first power loads are to be arbitrated by the use of an arbitration device. In the power supply system according to JP-A No. 2016-124391, no consideration is given to power loads that are already operating. When a second power load is operated, power consumption increases by an amount corresponding to an inrush current flowing to the second power load. As a result, total power consumption of the vehicle may exceed a threshold.

When the total power consumption of the vehicle exceeds the threshold, the voltage of the power supply drops. Thus, in a vehicle that includes plural first power loads that operate when operation requests are approved, at least one second power load that operates regardless of approval, and a power supply, there is scope for improvement in suppressing a voltage drop of the power supply.

SUMMARY

In consideration of the circumstances described above, an object of the present disclosure is to provide an arbitration device that may, in a vehicle that includes plural first power loads that operate when operation requests are approved, at least one second power load that operates regardless of approval, and a power supply, suppress a voltage drop of the power supply.

An arbitration device according to a first aspect of the present disclosure arbitrates operation requests from plural first power loads in a vehicle. The vehicle includes: the plural first power loads, each of which outputs operation request information prior to operating and operates after an operation request is approved; at least one second power load that outputs operation notice information prior to operating and operates regardless of approval; and a power supply that supplies electric power to the first power loads and the second power load. The arbitration device includes: a reception section that receives inputs of the operation request information and the operation notice information; a memory section that memorizes first power consumptions of the first power loads and a second power consumption of the second power load; a calculation section that reads from the memory section the first power consumption of each first power load from which the operation request information has been inputted to the reception section, reads from the memory section the second power consumption of each second power load from which the operation notice information has been inputted to the reception section, and calculates a total power consumption combining the first power consumption and the second power consumption; and a control section at which priorities of the plural first power loads are specified. When the total power consumption exceeds a threshold, the control section selects which of the first power loads to approve based on the priorities and causes each operating first power load that is not approved to pause operation, and, when the total power consumption is less than or equal to the threshold, the control section allows each operating first power load to continue operation.

In the arbitration device according to the first aspect, inputs of operation request information from the first power loads and operation notice information from the second power load(s) are received at the reception section. The first power consumptions of the first power loads and second power consumption(s) of the second power load(s) are memorized at the memory section. The calculation section reads from the memory section the first power consumption of each first power load for which operation request information has been inputted to the reception section, reads from the memory section the second power consumption of each second power load for which operation notice information has been inputted to the reception section, and calculates a total power consumption combining the first power consumption(s) and second power consumption(s). The control section specifies the priorities of the plural first power loads.

If this total power consumption would exceed the threshold, the control section selects (a) first power load(s) to be approved based on the priorities. Hence, each approved first power load continues operation and each first power load that is not approved is paused. Alternatively, if the total power consumption is below the threshold, the control section allows each operating first power load to continue operation. Thus, because operation of a subset of the first power loads is paused when the total power consumption calculated by the calculation section would exceed the threshold, the total power consumption does not exceed the threshold and a voltage drop of the power supply may be suppressed.

At the control section of an arbitration device according to a second aspect of the present disclosure, respective ranks are assigned to the plural first power loads, and the priorities are decided based on the ranks.

In the arbitration device according to the second aspect, the ranks are assigned to the plural first power loads. Hence, because the priorities are decided based on the ranks, which first power load(s) to pause may be determined even when operating first power loads are operating with similar power consumption.

At the control section of an arbitration device according to a third aspect of the present disclosure, for each of the plural first power loads, a pause duration when operation of the each first power load is paused is specified based on the rank, the pause duration being shorter for a first power load with a higher rank than for a first power load with a lower rank.

In the arbitration device according to the third aspect, the pause duration of a first power load with a higher rank is shorter than the pause duration of a first power load with a lower rank, Hence, among first power loads whose operations are paused, a first power load with a higher rank restarts operation earlier. Therefore, a situation of, among the first power loads whose operations are paused, an operation duration of a first power load with lower necessity being longer is suppressed. Thus, necessary power loads may be operated efficiently.

An arbitration device according to a fourth aspect of the present disclosure further includes a time measurement section that measures respective operation durations of the plural first power loads. In preference of the rank, the control section sets a priority of a first power load with a shorter operation duration measured by the time measurement section to be higher than a priority of a first power load with a longer operation duration measured by the time measurement section.

In the arbitration device according to the fourth aspect, among first power loads whose operations are paused, a first power load with a shorter pause duration restarts operation earlier than a first power load with a longer pause duration. Therefore, differences in operation durations between the first power loads may be reduced. Thus, a situation in which operation durations of only a subset of the plural first power loads are shortened may be suppressed.

The control section of an arbitration device according to a fifth aspect of the present disclosure causes a first power load among a plural number of the first power loads whose operations have been paused to restart operation at a delayed time relative to a first power load with a higher priority.

In the arbitration device according to the fifth aspect, a restart of operation of a first power load with a lower priority is delayed from a restart of operation of a first power load with a higher priority. Therefore, plural first power loads whose operations have been paused do not restart operations at the same time. Thus, a temporary increase in power consumption may be suppressed.

At the control section of an arbitration device according to a sixth aspect of the present disclosure, the first power loads are classified as a small power load with a smaller power consumption and a large power load with a larger power consumption than the small power load, and the control section sets the small power load to a higher priority than the large power load.

In the arbitration device according to the sixth aspect, when the total power consumption would exceed the threshold, among the plural first power loads, operation of the small power load continues and operation of the large power load is paused. Therefore, total power consumption is smaller than if the large power load continued operation. Thus, even if the power consumption of any of the operating first power loads and the second power load temporarily increases, the total power consumption may be prevented from exceeding the threshold.

According to the present disclosure, an arbitration device may be provided that may suppress a voltage drop of a power supply in a vehicle including plural first power loads that operate when operation requests are approved, at least one second power load that operates regardless of approval, and the power supply.

BRIEF DESCRIPTION OF THE DRAWINGS

Exemplary embodiments of the present disclosure will be described in detail based on the following figures, wherein:

FIG. 4 is a table showing parameters and operation decision results that are specified for respective power loads shown in FIG. 1;

FIG. 10 is a table showing parameters and operation decision results that are specified for respective power loads at the ECU according to the second exemplary embodiment;

FIG. 13 is a table showing parameters, priorities, operation durations, operation decision results and restart priorities that are specified for respective power loads at the ECU according to the third exemplary embodiment;

FIG. 14 is a graph showing power consumptions of power loads whose operations are controlled by the ECU shown in FIG. 12;

DETAILED DESCRIPTION

First Exemplary Embodiment

Figure 1:
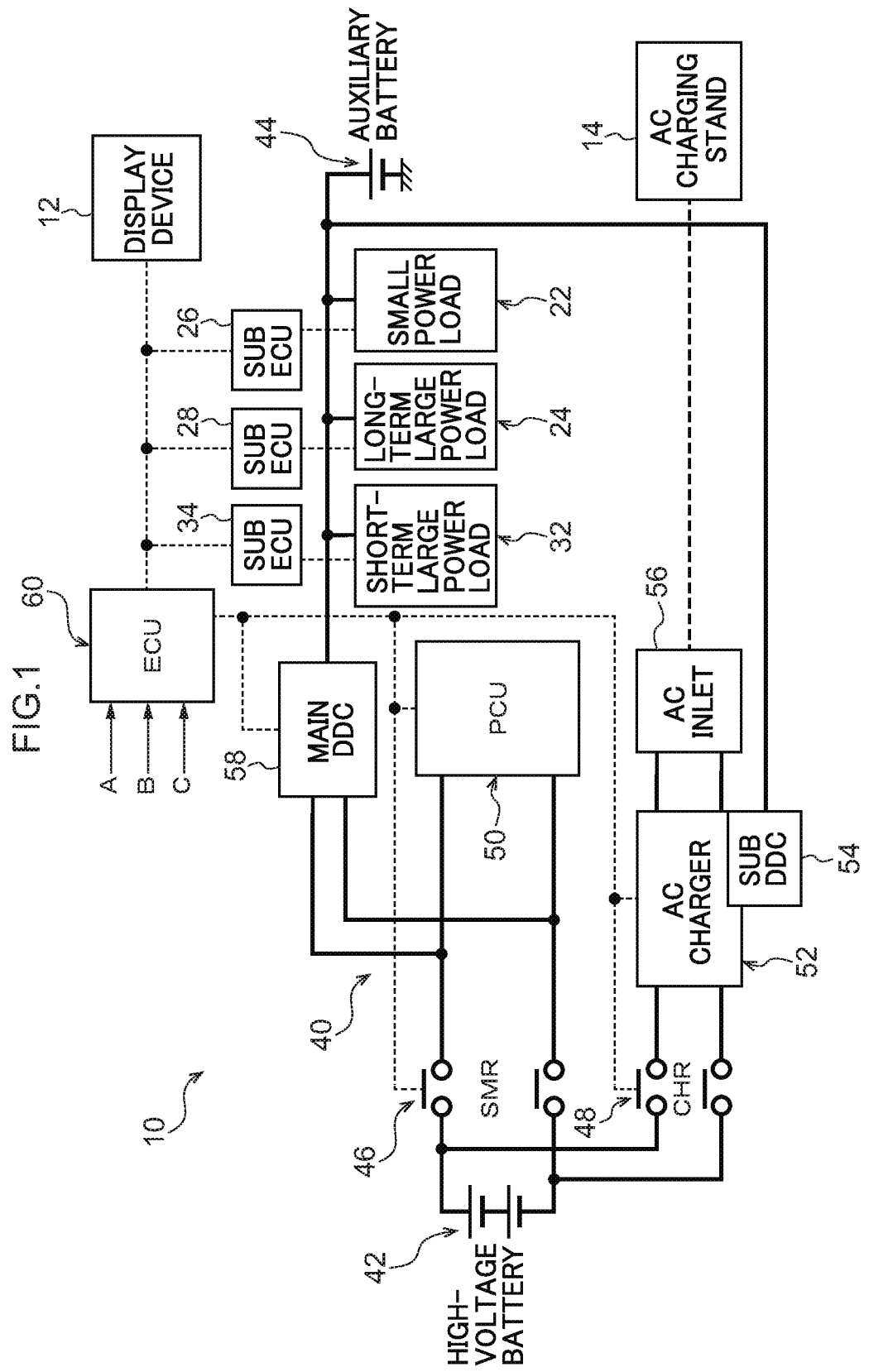
FIG. 1 is a block diagram showing a configuration of a main power supply unit of a vehicle in which an ECU according to a first exemplary embodiment is employed.

FIG. 1 shows a configuration of part of a vehicle 10 in which an ECU 60 according to a first exemplary embodiment is employed. The vehicle 10 includes a display device 12, a small power load 22, a long-term large power load 24, a short-term large power load 32, and a power supply unit 40 that serves as an example of a power supply system. The power supply unit 40 can be recharged from an AC charging stand 14.

In the descriptions below, the meaning of the term "ECU" is intended to include an electronic control unit, the meaning of the term "AC" is intended to include alternating current, the meaning of the term "DC" is intended to include direct current, the meaning of the term "PCU" is intended to include a power control unit, the meaning of the term "DDC" is intended to include a DC/DC converter, the meaning of the term "SMR" is intended to include a system main relay, and the meaning of the term "CHR" is intended to include a charge relay.

—Overall Structure—

The display device 12 includes a touch panel, which is not shown in the drawings. The display device 12 displays various kinds of information about the vehicle 10. In addition, various settings of the vehicle 10 may be implemented at the display device 12 by operation of the touch panel.

The small power load 22 and long-term large power load 24 are an example of plural first power loads. Prior to operating, the small power load 22 and the long-term large power load 24 output operation request information to the ECU 60. The small power load 22 and long-term large power load 24 operate when operation requests are approved by the ECU 60. Operations of the small power load 22 and the long-term large power load 24 can be paused by the ECU 60. In the present exemplary embodiment, as an example, operation of the long-term large power load 24 can be paused.

Small Power Load

As an example, the small power load 22 is constituted by plural power loads that are not shown in the drawings. The small power load 22 includes power loads that have low power consumptions during operation. To be specific, the small power load 22 includes a water pump, a battery fan, a mirror heater, a wiper, an inverter water pump, a navigation system, audio equipment, a camera, a radar, a doorlock, a dashboard instrument, a head-up display (HUD) and a smart key. The small power load 22 also includes a steering wheel position adjustment mechanism (tilt/telescope), a TPM (an apparatus that obtains tire pressures), a horn, a headlamp, a dome lamp, an EGR (exhaust gas recirculation system) motor and so forth. In the first exemplary embodiment, these power loads are collectively described as the single small power load 22.

A sub ECU 26 is connected to the small power load 22. The sub ECU 26 receives information decided at the ECU 60 that approves operation of the small power load 22 and the sub ECU 26 causes the small power load 22 to operate. Alternatively, the sub ECU 26 receives information decided at the ECU 60 that disapproves operation of the small power load 22 (possibly pausing operation) and the sub ECU 26 causes the small power load 22 to be non-operational (possibly pausing operation).

Operation request information from the small power load 22 is sent to the ECU 60 when various switches that are not shown in the drawings are operated by an occupant of the vehicle 10. The various switches and sub ECU 26 corresponding with the small power load 22 are encompassed by the term "the small power load 22".

Long-Term Large Power Load

The long-term large power load 24 serves as an example of a first power load and a large power load, and is constituted by plural power loads that are not shown in the drawings. The long-term large power load 24 includes power loads with higher power consumptions than the small power load 22 during operation. To be specific, the long-term large power load 24 includes an air conditioner, a defogger, a seat heater, a wiper de-icer, an electric heated windshield (EHW) and so forth. In the first exemplary embodiment, these power loads are collectively described as the single long-term large power load 24.

A sub ECU 28 is connected to the long-term large power load 24. The sub ECU 28 receives information decided at the ECU 60 that approves operation of the long-term large power load 24 and the sub ECU 28 causes the long-term large power load 24 to operate. Further, the sub ECU 28 receives information decided at the ECU 60 that disapproves operation of the long-term large power load 24 (possibly pausing operation) and the sub ECU 28 causes the long-term large power load 24 to be non-operational (possibly pausing operation).

Operation request information from the long-term large power load 24 is sent to the ECU 60 when various switches that are not shown in the drawings are operated by the occupant of the vehicle 10. The various switches and sub ECU 28 corresponding with the long-term large power load 24 are encompassed by the term "the long-term large power load 24".

Short-Term Large Power Load

The short-term large power load 32 is an example of the second power load. As an example, the short-term large power load 32 is constituted by plural power loads that are not shown in the drawings (power loads included in spinal reflex-related equipment). The short-term large power load 32 includes power loads with higher power consumptions than the small power load 22 during operation and with shorter periods of use (operation) than the long-term large power load 24. Prior to operating, the short-term large power load 32 outputs operation notice information to the ECU 60. The meaning of the term "prior to operating" is intended to include a point in time that precedes an operation start time by a pre-set specified duration. The short-term large power load 32 includes power loads that are operated regardless of operation approval from the ECU 60. In other words, the short-term large power load 32 is a power load that is forcedly operated after the specified duration from the output of the operation notice information.

To be specific, the short-term large power load 32 includes electronic power steering (EPS), an electronically controlled brake system (ECB), a pre-crash seatbelt apparatus (PSB), and air suspension. In the first exemplary embodiment, these power loads are collectively described as the single short-term large power load 32.

A sub ECU 34 is connected to the short-term large power load 32. The sub ECU 34 causes the short-term large power load 32 to be operational or non-operational based on operation information that is sent when various switches that are not shown in the drawings are operated by the occupant of the vehicle 10. That is, the short-term large power load 32 operates regardless of approval from the ECU 60. The various switches and sub ECU 34 corresponding with the short-term large power load 32 are encompassed by the term "the short-term large power load 32".

Power Supply Section

The power supply unit 40 includes, for example, a high-voltage battery 42, an auxiliary battery 44, an SMR 46, a CHR 48, a PCU 50, an AC charger 52, a sub DDC 54, an AC inlet 56, a main DDC 58, and the ECU 60, which is described below.

The high-voltage battery 42 and auxiliary battery 44 are an example of a power supply. The high-voltage battery 42 is connected to the PCU 50 and the main DDC 58 via the SMR 46. The main DDC 58 is connected to the auxiliary battery 44. The small power load 22, the long-term large power load 24 and the short-term large power load 32 are connected to a power supply line between the main DDC 58 and the auxiliary battery 44. The PCU 50 controls outputs of power to be supplied to the small power load 22, the long-term large power load 24 and the short-term large power load 32. The main DDC 58 steps down the voltage of power supplied from the high-voltage battery 42 and supplies power to the small power load 22, the long-term large power load 24 and the short-term large power load 32.

The AC charger 52 is connected to the high-voltage battery 42 via the CHR 48, and the AC inlet 56 is connected to the AC charger 52. Thus, power from the AC charging stand 14 can be supplied to the AC charger 52 via the AC inlet 56. A portion of the power supplied to the AC charger 52 is charged into the high-voltage battery 42 by the CHR 48. The sub DDC 54 is provided at the AC charger 52, and the sub DDC 54 is connected to the auxiliary battery 44. The rest of the power supplied to the AC charger 52 is charged into the auxiliary battery 44 via the sub DDC 54.

Thus, the high-voltage battery 42 and auxiliary battery 44 of the power supply unit 40 may be recharged from the AC charging stand 14, and electric power is supplied from the high-voltage battery 42 and the auxiliary battery 44 to the small power load 22, the long-term large power load 24 and the short-term large power load 32.

—Configuration of Principal Elements—

Now the ECU 60, which serves as an example of the arbitration device, is described.

The ECU 60 is capable of sending and receiving information (electronic signals) to and from the SMR 46, the CHR 48, the PCU 50, the AC charger 52, the main DDC 58, the sub ECUs 26, 28 and 34, and the display device 12. The meaning of the dotted lines in FIG. 1 is intended to include signal transmission and reception paths. The ECU 60 arbitrates operation requests from the small power load 22 and the long-term large power load 24. The ECU 60 also receives operation notices from the short-term large power load 32.

Figure 2:
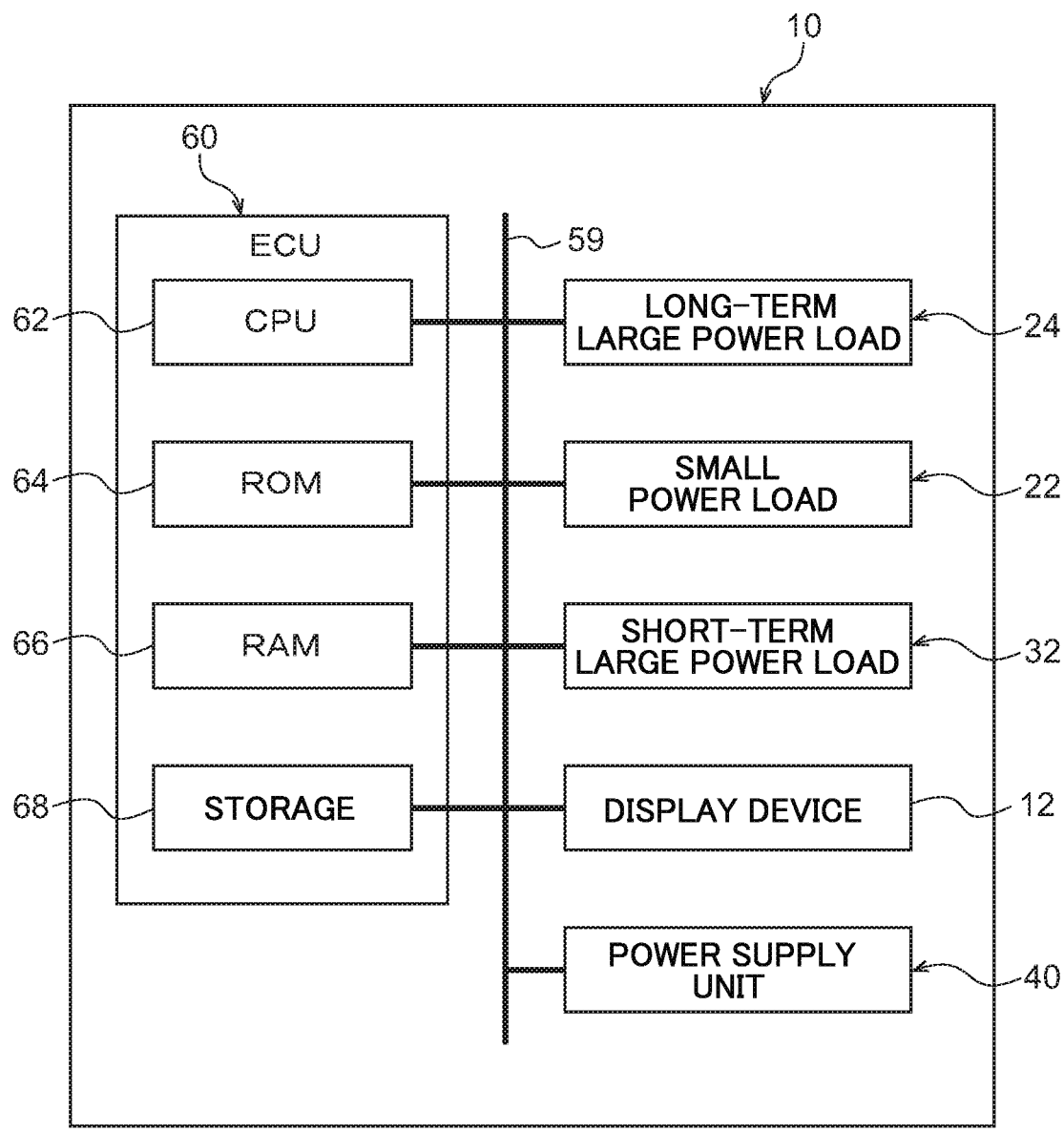
FIG. 2 is a block diagram showing a hardware configuration of the power supply unit shown in FIG. 1.

The ECU 60 shown in FIG. 2 includes a central processing unit (CPU) 62, read-only memory (ROM) 64, random access memory (RAM) 66, storage 68, and a timer for measuring time that is not shown in the drawings. The ECU 60, the small power load 22, the long-term large power load 24, the short-term large power load 32, the display device 12 and the power supply unit 40 (other than the ECU 60) are connected via a bus 59 to be capable of communicating with one another.

The CPU 62 is a central processing unit that executes various programs including a power control program and controls operations of respective sections of the power supply unit 40. That is, the CPU 62 reads a program from the ROM 64 or the storage 68, and executes the program using the RAM 66 as a workspace. The CPU 62 performs control of the structures described above and various kinds of computational processing and the like in accordance with programs recorded in the ROM 64 or the storage 68.

The ROM 64 stores various programs and various kinds of data. The RAM 66 serves as a workspace, temporarily memorizing programs and data. The storage 68 is structured by, for example, Flash ROM (read-only memory). The storage 68 stores various programs, including an operating system, and various kinds of data.

FIG. 1 depicts a state in which various kinds of information represented by arrow A, arrow B and arrow C are being sent to the ECU 60. Arrow A represents, for example, on/off information of a courtesy switch. Arrow B represents, for example, OK/not OK information of a door lock. Arrow C represents, for example, on/off information of a push start switch.

—Functional Structures—

When executing the power supply program for the small power load 22, the long-term large power load 24 and the short-term large power load 32, the ECU 60 utilizes the hardware resources described above to realize various functions. Functional structures realized by the ECU 60 are now described.

Figure 3:
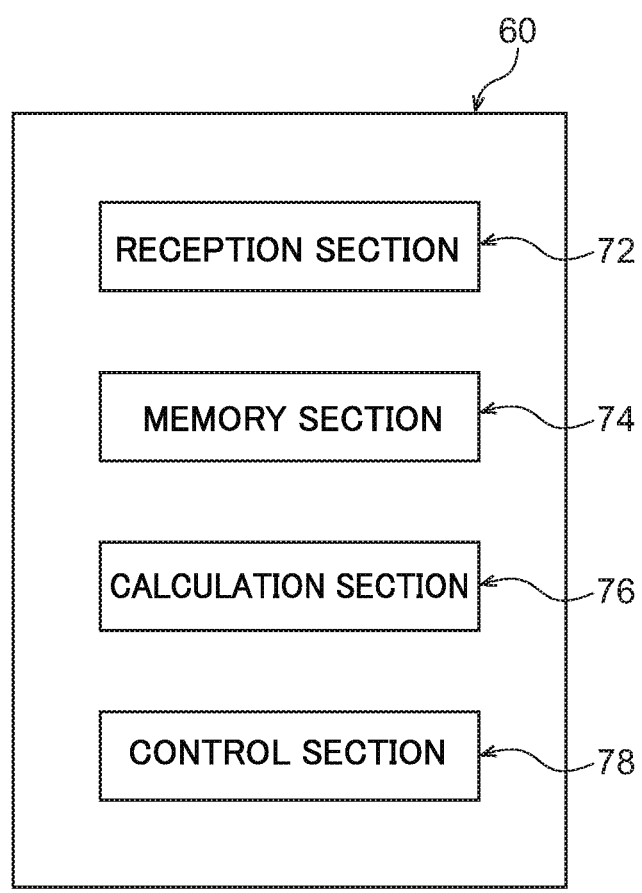
FIG. 3 is a block diagram showing an example of functional structures of the ECU shown in FIG. 1.

As shown in FIG. 3, as functional structures, the ECU 60 includes a reception section 72, a memory section 74, a calculation section 76 and a control section 78. The functional structures are realized by the CPU 62 of the ECU 60 (see FIG. 2) reading a program and information (data) memorized in the ROM 64 or storage 68 (see FIG. 2) and executing the program.

The reception section 72 receives inputs of operation request information from the small power load 22 and the long-term large power load 24 (see FIG. 1). The reception section 72 also receives inputs of operation notice information from the short-term large power load 32 (see FIG. 1). The reception section 72 stores, in the storage 68, information (including classes and titles) on the small power load 22 and the long-term large power load 24 for which operation request information has been inputted.

The memory section 74 includes the storage 68 (see FIG. 2). The memory section 74 memorizes a power consumption of the small power load 22 and a power consumption of the long-term large power load 24, which serve as respective first power consumptions. The memory section 74 also memorizes a power consumption of the short-term large power load 32, which serves as a second power consumption. In the present exemplary embodiment, as an example, the first power consumptions and second power consumption are memorized in the memory section 74 in advance; power consumptions of the respective power loads are not sensed. The power consumptions represent, for example, a maximum power consumption value at a time when the power consumption is at a maximum due to inrush current, and a steady power consumption value at a time of a steady state.

The calculation section 76 reads from the memory section 74 a first power consumption Pw1 (not shown in the drawings) of every (operating) small power load 22 and long-term large power load 24 for which power request information has been inputted to the reception section 72. The calculation section 76 reads from the memory section 74 a second power consumption Pw2 (not shown in the drawings) of every short-term large power load 32 for which power notice information has been inputted at the reception section 72. Then, the calculation section 76 combines a summed first power consumption SPw1 (not shown in the drawings) and a summed second power consumption SPw2 (not shown in the drawings) to calculate a total power consumption TPw (=SPw1+SPw2, not shown in the drawings). The obtained total power consumption TPw is memorized at the memory section 74.

Priorities of the small power load 22 and the long-term large power load 24 are specified at the control section 78. The control section 78 reads the total power consumption TPw from the memory section 74. Then, if the total power consumption TPw exceeds a pre-specified power threshold K (see FIG. 8), the control section 78 selects which of the small power load 22 and the long-term large power load 24 to approve, based on the priorities. The control section 78 causes a power load that is not approved among the operating small power load 22 and long-term large power load 24 to pause operation. Alternatively, if the total power consumption TPw is equal to or less than the threshold K, the control section 78 approves operations of the small power load 22 and the long-term large power load 24 that are operating (i.e., allows the operations to continue).

FIG. 4 shows ranks and pause durations of the small power load 22 and long-term large power load 24 (see FIG. 2) that are memorized in the memory section 74 (see FIG. 3), the priorities specified at the control section 78 (see FIG. 3), and operation decisions which are decision results from the control section 78. A rank, pause duration, priority and operation decision are not relevant for the short-term large power load 32 (see FIG. 2), so are not shown.

The meaning of the term "rank" is intended to include respective pre-specified (assigned) gradings of the small power load 22 and the long-term large power load 24. In the present exemplary embodiment, as an example, rank A is specified for the small power load 22 and rank B is specified for the long-term large power load 24. In the descriptions below, rank A is the highest rank and the ranks descend to rank Z.

The ranks need not be specified by power consumption amounts. For example, power loads that are relevant to safety of the vehicle 10 may be specified as rank A, power loads that are relevant to laws and regulations specified as rank B, power loads that are relevant to component protection specified as rank C, power loads that are relevant to marketability specified as rank D, and power loads that are relevant to additional value specified as rank E. In this case, rank A power loads and rank B power loads are exempt from pauses in operation.

Examples of rank A include the camera and radar. Examples of rank B include the dashboard instrument and headlamps. Examples of rank C include pumps and fans. Examples of rank D include the steering wheel position adjustment mechanism, HUD, navigation system and audio equipment. Examples of rank E include the TMP.

The meaning of the term "pause duration" is intended to include a duration from the moment operation of a power load is stopped until the moment operation of the power load is restarted. A pause duration is specified with consideration of a duration passing from an operation start time at which the power consumption of the short-term large power load 32 is largest due to an inrush current to a time at which the power load of the short-term large power load 32 has relaxed into a steady state. In the present exemplary embodiment, pause durations are specified to be longer than this passing duration. In the ECU 60, pause durations when operations are paused for each of the small power load 22 and the long-term large power load 24 are specified based on the ranks mentioned above. For example, a pause duration T1 of the small power load 22 with the higher rank is shorter than a pause duration T2 of the long-term large power load 24 with the lower rank.

The meaning of the term "priorities" is intended to include priorities assigned by the ECU 60 to the respective power loads in order to identify power loads whose operations are to be given precedence. That is, whereas the ranks are information specified in advance at the memory section 74, the priorities differ in being information of priorities assigned by the ECU 60. In the present exemplary embodiment, as an example, the ECU 60 decides (collective) priorities based on ranks, with the small power load 22 with the higher rank at first priority and the long-term large power load 24 with the lower rank at second priority. That is, the small power load 22 is given a higher priority than the long-term large power load 24.

The information shown in the operation decision column represents results of decisions at the ECU 60 to pause or continue operations of the small power load 22 and the long-term large power load 24. As an example, FIG. 4 shows results in which the ECU 60 decides to pause operation of the long-term large power load 24 and decides to continue operation of the small power load 22.

—Operation and Effects—

Now, operation of the ECU 60 according to the first exemplary embodiment is described.

Figure 5:
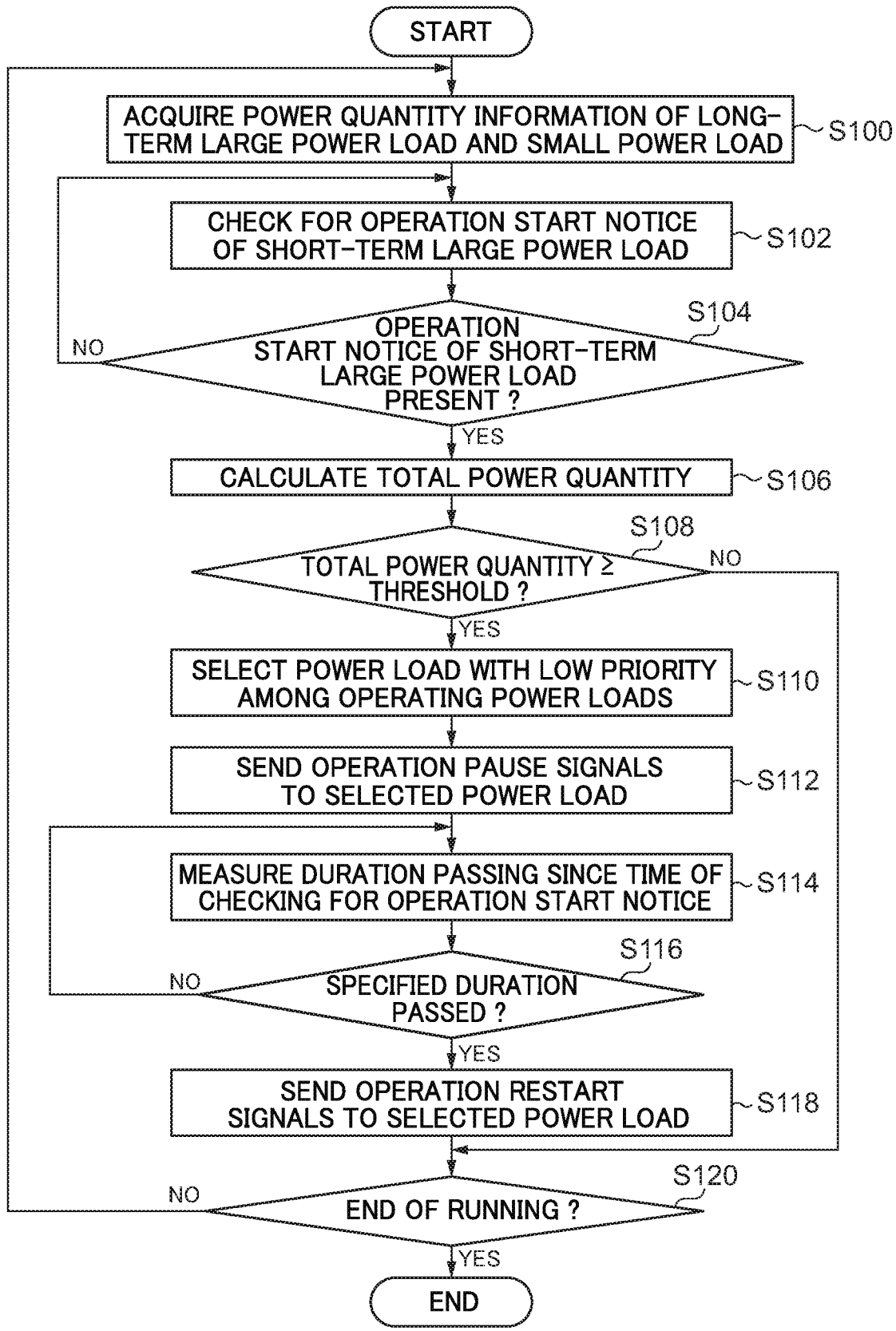
FIG. 5 is a flowchart showing a flow of power control processing employing the ECU shown in FIG. 3.

FIG. 5 is a flowchart showing a flow of power control processing (arbitration processing) of the small power load 22 and long-term large power load 24 (see FIG. 1) by the ECU 60 (see FIG. 1). See the drawings from FIG. 1 to FIG. 3 for the respective parts of the vehicle 10; specific figure numbers are omitted in this description. The ECU 60 implements the power control processing by the CPU 62 reading the power control program from the ROM 64 or the storage 68, loading the power control program into the RAM 66, and executing the power control program. The CPU 62 reads the ranks of the power loads to decide the priorities of the power loads.

In step S100, the CPU 62 acquires the first power consumptions of the operating long-term large power load 24 and small power load 22 from the storage 68. Then the CPU 62 proceeds to step S102.

In step S102, the CPU 62 checks for the presence of an operation start notice from the short-term large power load 32. Then the CPU 62 proceeds to step S104.

In step S104, if the CPU 62 determines that an operation start notice of the short-term large power load 32 is present (YES), the CPU 62 starts operation of the timer, which is not shown in the drawings, and proceeds to step S106. If the CPU 62 determines that there is no operation start notice of the short-term large power load 32 (NO), the CPU 62 returns to step S102.

In step S106, the CPU 62 acquires the second power consumption for the short-term large power load 32 issuing the operation start notice from the storage 68. The CPU 62 then calculates a total power consumption by summing the acquired first power consumptions with the acquired second power consumption. This calculated total power consumption is basically a sum of the maximum values of the first power consumptions and the maximum value of the second power consumption. Then the CPU 62 proceeds to step S108.

In step S108, the CPU 62 makes a determination as to whether the total power consumption is at least the threshold K. If the total power consumption is greater than or equal to the threshold K (YES), the CPU 62 proceeds to step S110. If the total power consumption is less than the threshold K (NO), the CPU 62 proceeds to step S120.

In step S110, among the operating long-term large power load 24 and small power load 22, the CPU 62 selects the long-term large power load 24 with the lower priority. Then the CPU 62 proceeds to step S112.

In step S112, the CPU 62 sends operation pause signals to the selected long-term large power load 24. Accordingly, the selected long-term large power load 24 pauses operation. Then the CPU 62 proceeds to step S114.

In step S114, the CPU 62 utilizes the timer that is not shown in the drawings to measure the duration that has passed since the time of checking for an operation start notice of the short-term large power load 32. Then the CPU 62 proceeds to step S116.

In step S116, the CPU 62 makes a determination as to whether the duration measured in step S114 has passed a pre-set specified duration. If the measured duration is longer than the specified duration (YES), the CPU 62 proceeds to step S118. If the measured duration is less than or equal to the specified duration (NO), the CPU 62 repeats step 114 and step S116. The meaning of the measured duration being longer than the specified duration is intended to encompass a transition of the state of the second power consumption of the short-term large power load 32 from a maximum state caused by inrush current to a steady state.

In step S118, the CPU 62 sends operation restart signals to the selected long-term large power load 24. Accordingly, the selected long-term large power load 24 restarts operation. Then the CPU 62 proceeds to step S120.

In step S120, the CPU 62 makes a determination as to whether running of the vehicle 10 is ending based on whether an engine, which is not shown in the drawings, is operating (for example, on/off information of the push start switch). If running is ending (YES), the CPU 62 ends the program. If running is continuing (NO), the CPU 62 returns to step S100.

Figure 6:
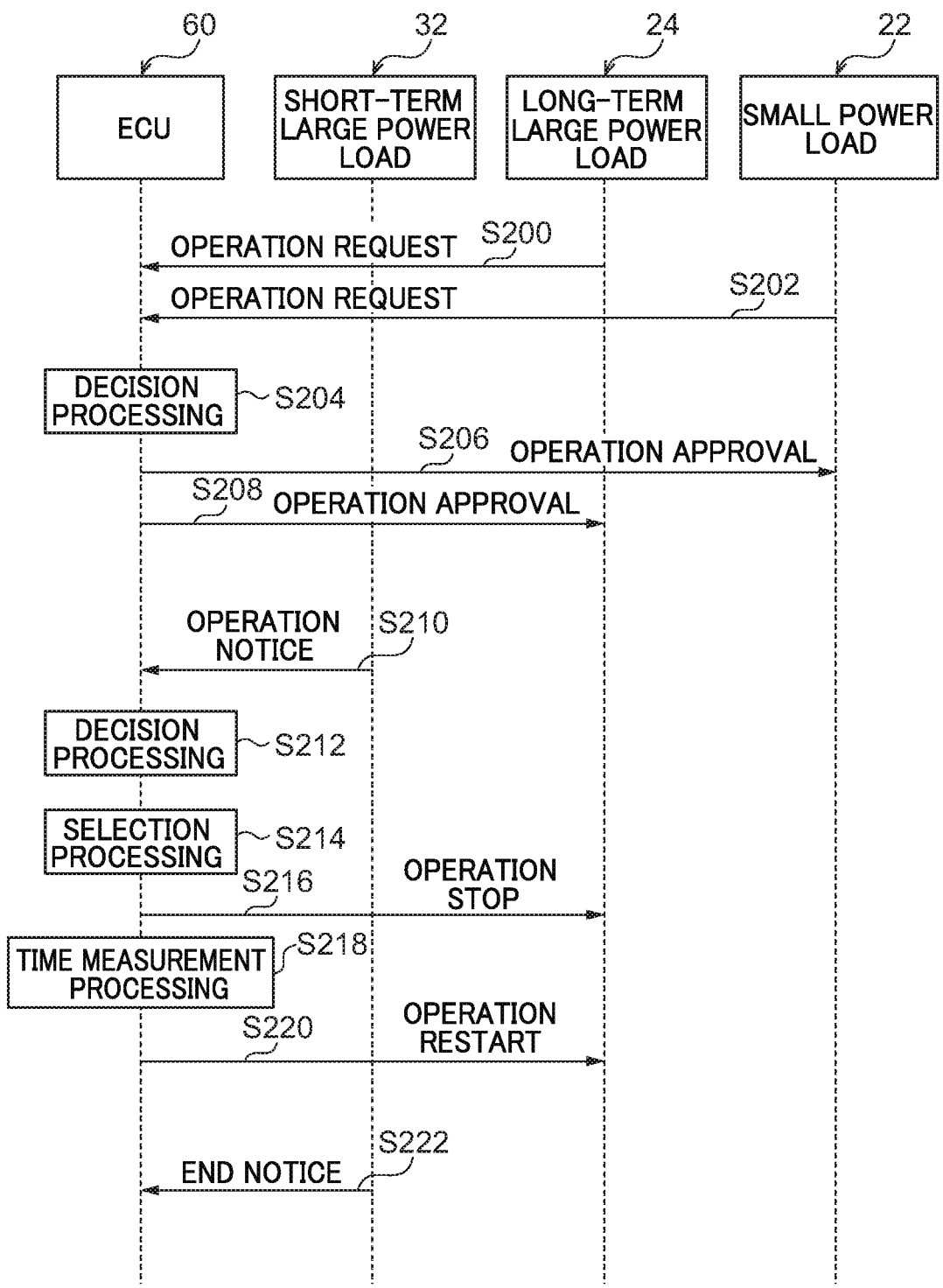
FIG. 6 is a sequence chart illustrating the flow of the power control processing employing the ECU shown in FIG. 3.

FIG. 6 is a sequence chart illustrating the flow of the power control processing (arbitration processing) of the small power load 22 and long-term large power load 24 by the ECU 60. See the drawings from FIG. 1 to FIG. 3 for the respective parts of the vehicle 10; specific figure numbers are omitted in this description. FIG. 6 shows states starting from a time when operation requests are issued (sent) from the small power load 22 and the long-term large power load 24.

In step S200, an operation request is issued from the long-term large power load 24 to the ECU 60.

In step S202, an operation request is issued from the small power load 22 to the ECU 60.

In step S204, the ECU 60 executes determination processing to determine whether a sum of the first power consumptions of the small power load 22 and the long-term large power load 24 exceeds the threshold K. In this example, the short-term large power load 32 is not operating and the summed first power consumptions do not exceed the threshold K. Accordingly, operations of the small power load 22 and the long-term large power load 24 are approved.

In step S206, the ECU 60 sends operation approval signals to the small power load 22. Accordingly, the small power load 22 starts operation. In this case, although the small power load 22 issued the operation request later than the long-term large power load 24, the operation approval signals are sent to the small power load 22 earlier than the long-term large power load 24, because the small power load 22 has smaller power consumption than the long-term large power load 24.

In step S208, the ECU 60 sends operation approval signals to the long-term large power load 24. Accordingly, the long-term large power load 24 starts operation.

In step S210, an operation notice is issued from the short-term large power load 32 to the ECU 60. Operation of the short-term large power load 32 is to be started at a time when a pre-specified duration has passed from the time of the operation notice, regardless of control by the ECU 60.

In step S212, the ECU 60 performs determination processing to determine whether a sum of the first power consumptions and the second power consumption exceeds the threshold K. In this example, when the short-term large power load 32 is operated, the sum of the first power consumptions and the second power consumption would exceed the threshold K. Accordingly, the ECU 60 decides whether to cause an operation pause of the small power load 22 and the long-term large power load 24 (whether or not to approve the operations thereof).

In step S214, based on the priorities, the ECU 60 selects, for example, an operation pause of the long-term large power load 24. In other words, the ECU 60 approves operation only of the small power load 22.

In step S216, the ECU 60 sends operation stop signals to the long-term large power load 24. Accordingly, the long-term large power load 24 stops (pauses) operation.

In step S218, the ECU 60 utilizes the timer that is not shown in the drawings to measure the duration that has passed since the time of checking for the operation start notice from the short-term large power load 32.

In step S220, if the duration that has passed is longer than the specified duration, the ECU 60 sends operation restart signals to the long-term large power load 24. Accordingly, the long-term large power load 24 restarts operation.

In step S222, operation end signals are sent from the short-term large power load 32 to the ECU 60.

Figure 7:
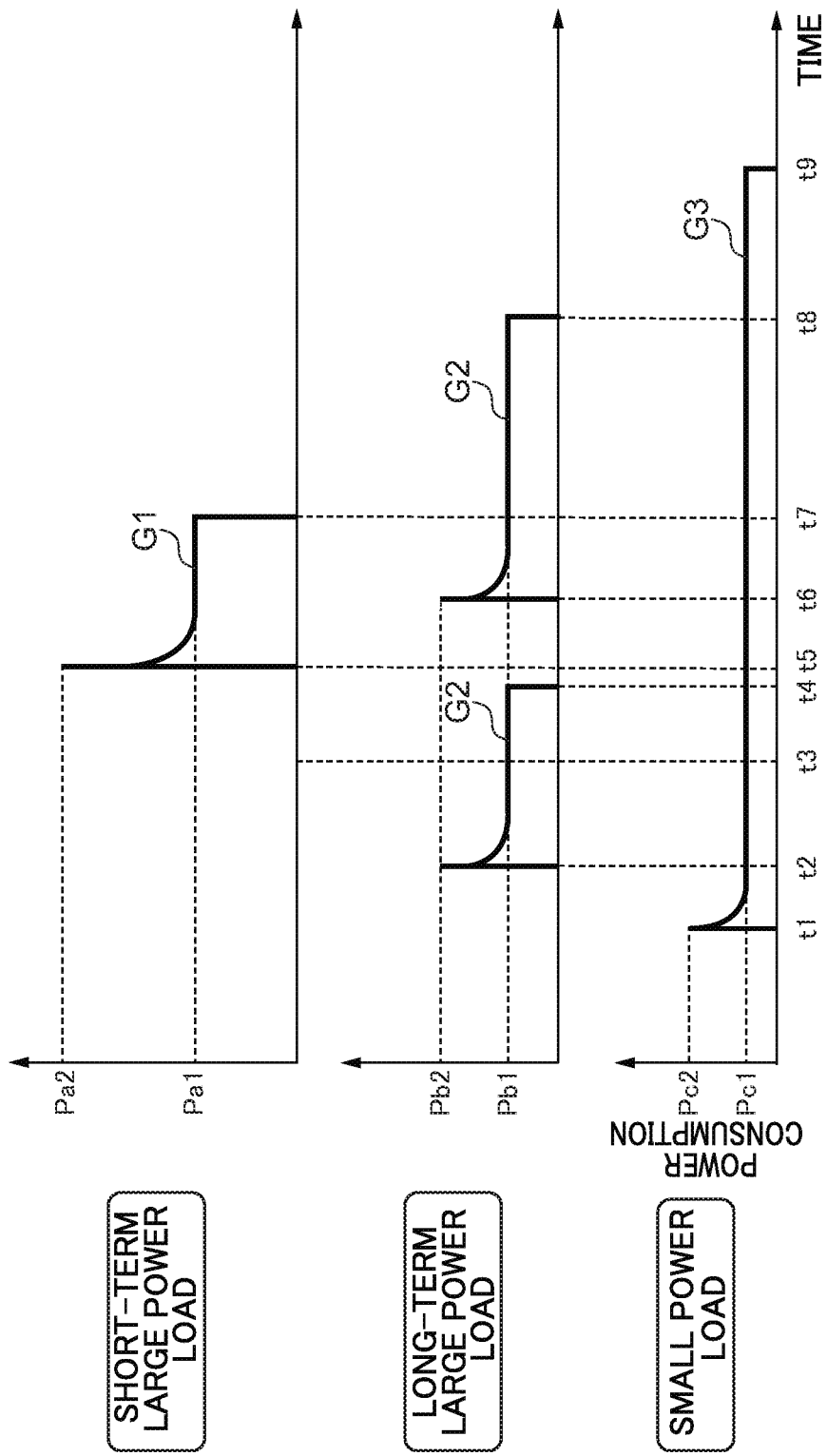
FIG. 7 is a graph showing power consumptions of power loads whose operations are controlled by the ECU shown in FIG. 3.

FIG. 7 shows power consumptions of the power loads when the processing described above is executed, with graphs G1, G2 and G3. Graph G1 represents changes in the power consumption of the short-term large power load 32, graph G2 represents changes in the power consumption of the long-term large power load 24, and graph G3 represents changes in the power consumption of the small power load 22. For each graph, the horizontal axis represents time and the vertical axis represents power consumption. Of the times t shown in FIG. 7 with numerals appended, the times t with larger numerals are intended to represent later times. The intervals between the times are not equal.

The short-term large power load 32 starts operation at time t5; at this time the power consumption of the short-term large power load 32 is at a maximum Pa2. The power consumption of the short-term large power load 32 in a steady state is Pa1 (<Pa2). The short-term large power load 32 stops operation at time t7.

The long-term large power load 24 starts operation at time t2; at this time the power consumption of the long-term large power load 24 is at a maximum Pb2. The power consumption of the long-term large power load 24 in a steady state is Pb1 (<Pb2). The long-term large power load 24 pauses operation at time t4, restarts operation at time t6, and stops operation at time t8. When the operation restarts, the power consumption is Pb2, and after the operation has restarted, the power consumption falls to Pb1.

The small power load 22 starts operation at time t1; at this time the power consumption of the small power load 22 is at a maximum Pc2. Power consumption of the small power load 22 in a steady state is Pc1 (<Pc2). The small power load 22 stops operation at time t9. In this example, there is no pause in operation of the small power load 22.

Figure 8:
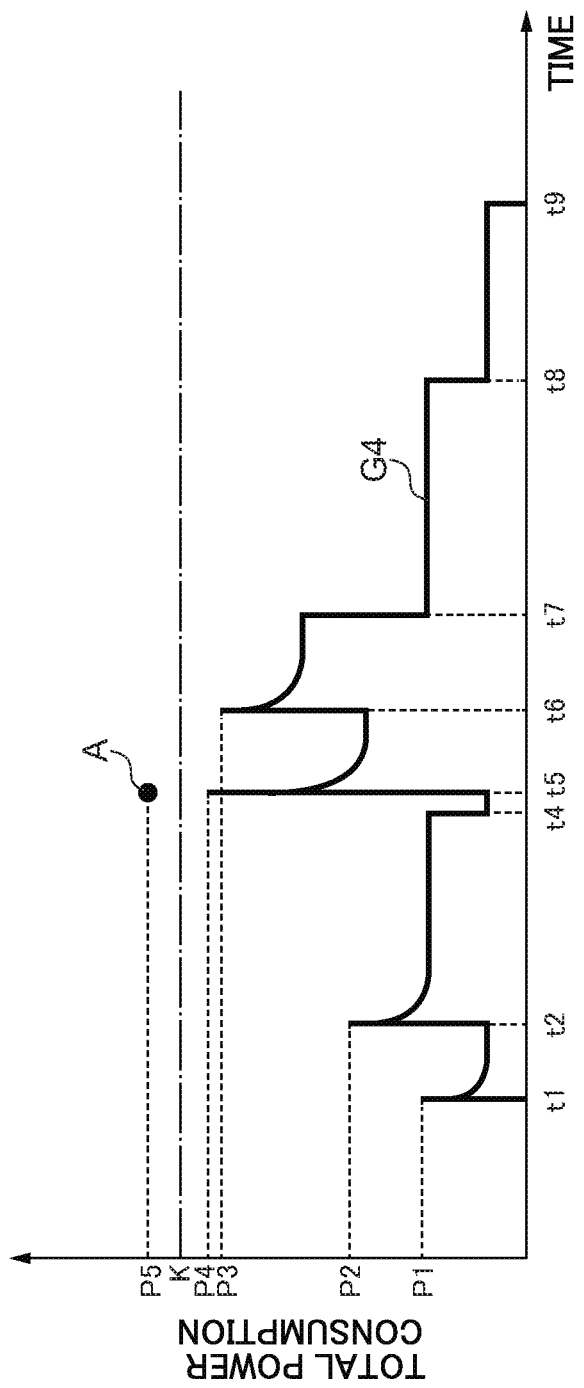
FIG. 8 is a graph showing total power consumption summing the power consumptions of the power loads shown in FIG. 7.

FIG. 8 shows a graph G4 of total power consumption summing the power consumptions of graphs G1, G2 and G3 (see FIG. 7). In FIG. 8, P1=Pc2, P2=Pc2+Pb2, P3=Pc1+Pb2+Pa1, P4=Pc1+Pa2, and P5=Pc1+Pb1+Pa2. The total power consumption P4 is less than the threshold K, and the total power consumption P5 is greater than the threshold K. The total power consumption P5 is indicated by point A.

As a comparative example, in a situation in which the long-term large power load 24 continues operation from time t4 to time t6, the total power consumption at time t5 is P5 (the value indicated by point A), which would exceed the threshold K. As a result, a voltage drop of the high-voltage battery 42 and the auxiliary battery 44 (see FIG. 1) might occur.

In contrast, when the ECU 60 according to the present exemplary embodiment is employed, the long-term large power load 24 pauses operation from time t4 to time t6. Therefore, the power consumption at time t5 is P4 and the threshold K is not exceeded. Consequently, a voltage drop of the high-voltage battery 42 and the auxiliary battery 44 may be suppressed.

In the ECU 60 as described above, inputs of operation request information from the small power load 22 and the long-term large power load 24 and inputs of operation notice information from the short-term large power load 32 are received at the reception section 72. The first power consumptions of the small power load 22 and the long-term large power load 24 and the second power consumption of the short-term large power load 32 are memorized at the memory section 74. The first power consumptions of each of the small power load 22 and long-term large power load 24 from which the operation request information has been inputted to the reception section 72 are read from the memory section 74 by the calculation section 76, and the second power consumption of the short-term large power load 32 from which the operation notice information has been inputted to the reception section 72 is read from the memory section 74 by the calculation section 76. A total power consumption combining the first power consumptions and the second power consumption is calculated at the calculation section 76. The priorities of the small power load 22 and the long-term large power load 24 are specified at the control section 78.

When the total power consumption would exceed the threshold K, based on the priorities, the small power load 22 is selected for approval by the control section 78. Hence, the approved small power load 22 continues operation, but the long-term large power load 24 that is not approved pauses operation. When the total power consumption is less than or equal to the threshold K, the control section 78 allows the operating small power load 22 and long-term large power load 24 to continue operations. Thus, because the long-term large power load 24 pauses operation when the total power consumption calculated at the calculation section 76 would exceed the threshold K, the total power consumption does not exceed the threshold K. Therefore, a voltage drop of the high-voltage battery 42 and the auxiliary battery 44 may be suppressed.

In the ECU 60, ranks are assigned to the small power load 22 and the long-term large power load 24. Hence, because the priorities are decided based on the ranks, which power load to pause may be determined even if the small power load 22 and the long-term large power load 24 are operating with similar power consumptions.

In the ECU 60, when the total power consumption would exceed the threshold K, among the small power load 22 and the long-term large power load 24, operation of the small power load 22 continues and operation of the long-term large power load 24 is paused. Therefore, total power consumption is lower than if operation of the long-term large power load 24 were continued. Thus, even if the power consumption of any of the small power load 22, the long-term large power load 24 and the short-term large power load 32 temporarily increases, the total power consumption may be prevented from exceeding the threshold K.

Second Exemplary Embodiment

Now, an ECU 80 that serves as an example of an arbitration device according to a second exemplary embodiment is described. The ECU 80 is provided in the vehicle 10 in place of the ECU 60 (see FIG. 1). Apart from the ECU 80, structures of the vehicle 10 according to the second exemplary embodiment are similar to structures according to the first exemplary embodiment, except in the number of power loads. Structures that are basically the same as in the ECU 60 are assigned the same reference symbols as in the ECU 60 and are not described here.

Figure 9:
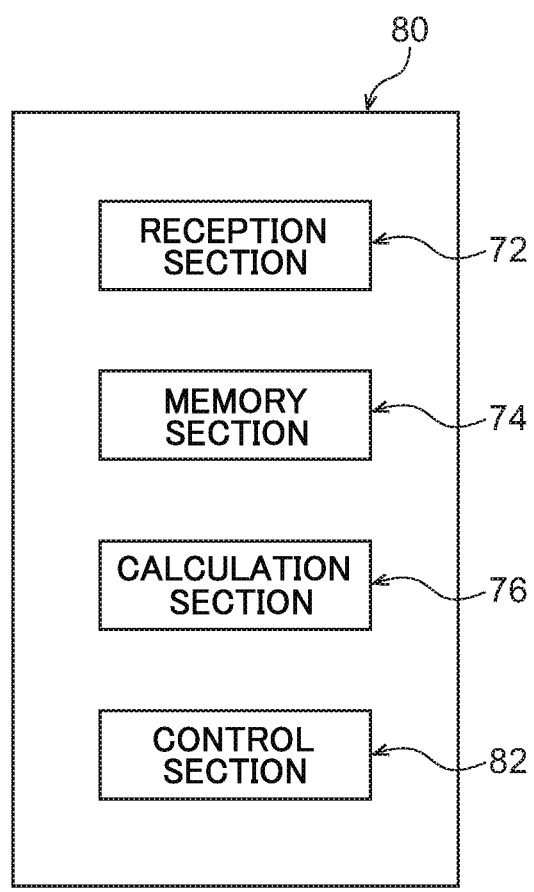
FIG. 9 is a block diagram showing an example of functional structures of an ECU according to a second exemplary embodiment.

As functional structures, the ECU 80 shown in FIG. 9 includes the reception section 72, the memory section 74, the calculation section 76 and a control section 82. The functional structures are realized by the CPU 62 (see FIG. 2) reading and executing a power control program memorized in the ROM 64 or storage 68 (see FIG. 2).

When the total power consumption would exceed the threshold K (see FIG. 8), the control section 82 selects which of the small power load 22 and the long-term large power load 24 to approve based on the priorities, and causes any power load among the operating small power load 22 and long-term large power load 24 that is not approved to pause operation. When the total power consumption is less than or equal to the threshold K, the control section 82 allows the operating small power load 22 and long-term large power load 24 to continue operations.

At the control section 82, respective ranks are assigned to a plural number of the small power load 22 and a plural number of the long-term large power load 24, and priorities thereof are decided based on the ranks. When respective operations of the plural small power loads 22 and the plural long-term large power loads 24 are to be paused, the control section 82 specifies pause durations based on the ranks. Power loads with higher ranks are specified with shorter pause durations than power loads with lower ranks.

Of the plural small power loads 22 and plural long-term large power loads 24 whose operations are paused, the control section 82 restarts operation of each at a delayed time relative to a power load with a higher priority. The control section 82 sets the small power loads 22 to higher priorities than the long-term large power loads 24.

As an example, FIG. 10 shows ranks, priorities, pause durations, operation decisions and restart priorities for two of the small power loads 22 and three of the long-term large power loads 24. The ranks and pause durations are specified in advance at the memory section 74. The priorities, operation decisions and restart priorities are decided by the ECU 80 based on the ranks. The orders of ranks and priorities are similar to the first exemplary embodiment. The smaller the number representing a pause duration, the shorter the duration.

Two of the short-term large power load 32 are simply shown as being separate. In the second exemplary embodiment, the two short-term large power loads 32 are classified as a short-term large power load A and a short-term large power load B. The three long-term large power loads 24 are classified as a long-term large power load C, a long-term large power load D and a long-term large power load E. The two small power loads 22 are classified as a small power load F and a small power load G. A total power consumption according to the second exemplary embodiment is calculated by summing a summed power consumption of the short-term large power loads A and B, a summed power consumption of the long-term large power loads C, D and E, and a summed power consumption of the small power loads F and G.

The long-term large power load C has rank C, priority 3, pause duration T3, and operation decision "continue". The long-term large power load D has rank D, priority 4, pause duration T4, operation decision "pause", and restart priority 1. The long-term large power load E has rank E, priority 5, pause duration T5, operation decision "pause", and restart priority 2. The small power load F has rank A, priority 1, pause duration T1, and operation decision "continue". The small power load G has rank B, priority 2, pause duration T2, and operation decision "continue".

—Operation and Effects—

Figure 11:
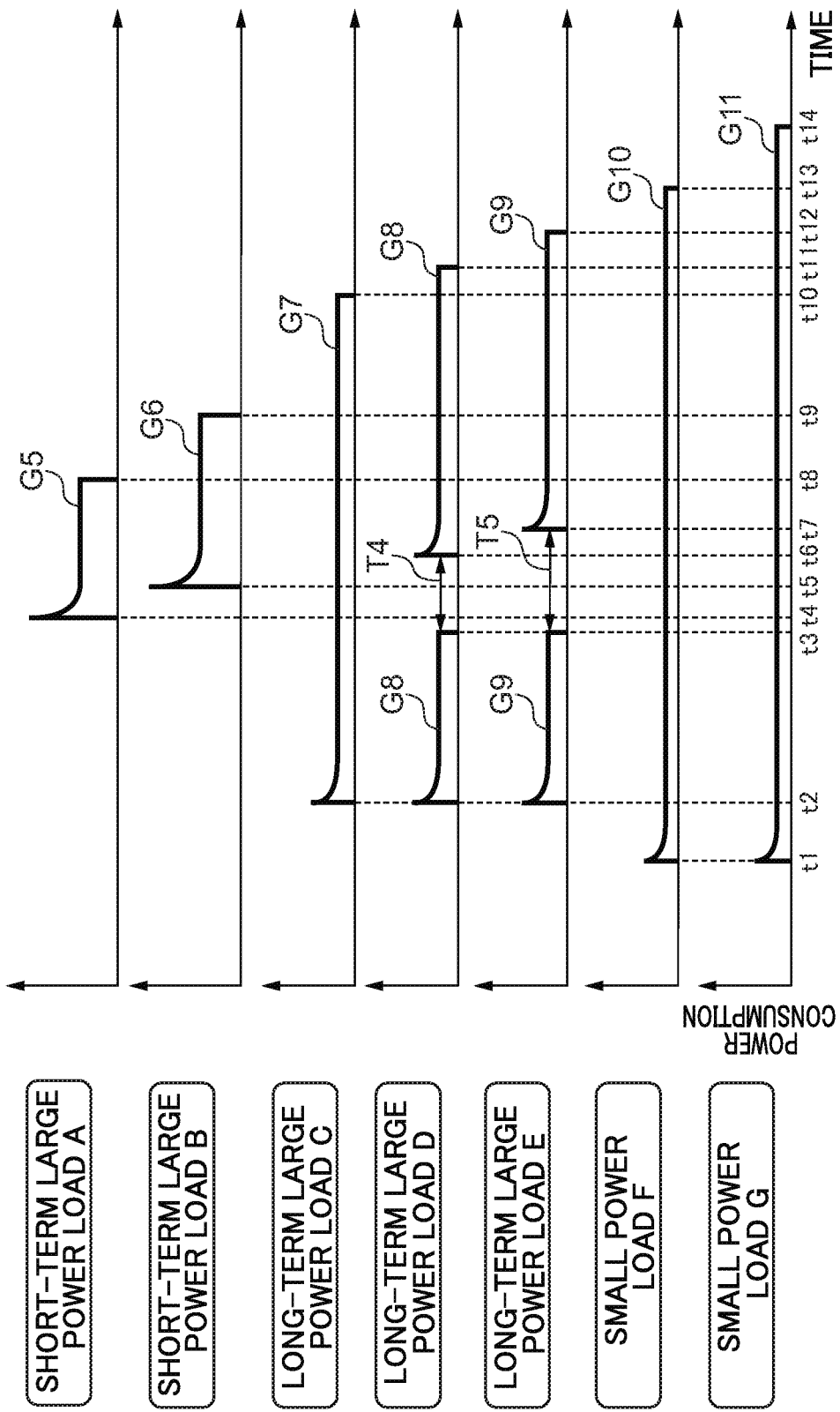
FIG. 11 is a graph showing power consumptions of power loads whose operations are controlled by the ECU shown in FIG. 9.

Now, operation of the ECU 80 according to the second exemplary embodiment is described using FIG. 11. FIG. 11 depicts changes in the power consumptions of the power loads whose power is controlled by the ECU 80. See the drawings of FIG. 1, FIG. 2 and FIG. 9 for the respective parts of the vehicle 10 including the ECU 80; specific figure numbers are omitted in this description. The times t shown in FIG. 11 are different from the times tin FIG. 7 and FIG. 8.

The graph G5 represents changes in the power consumption of the short-term large power load A, the graph G6 represents changes in the power consumption of the short-term large power load B, the graph G7 represents changes in the power consumption of the long-term large power load C, the graph G8 represents changes in the power consumption of the long-term large power load D, the graph G9 represents changes in the power consumption of the long-term large power load E, the graph G10 represents changes in the power consumption of the small power load F, and the graph G11 represents changes in the power consumption of the small power load G. For each graph, the horizontal axis represents time and the vertical axis represents power consumption.

The short-term large power load A starts operation and the power consumption thereof is at a maximum at time t4, and the operation is stopped at time t8. The short-term large power load B starts operation and the power consumption thereof is at a maximum at time t5, and the operation is stopped at time t9. Although not shown in the drawing, operation start notice information is sent from both the short-term large power load A and the short-term large power load B prior to time t4.

The ECU 80 specifies the priorities based on the specified ranks. When the total power load does not exceed the threshold K, the ECU 80 approves operations of the long-term large power loads C, D and E and the small power loads F and G for which inputs of operation request information have been received prior to time t1. When the ECU 80 receives inputs of operation notice information from the short-term large power loads A and B at times prior to time t3, the ECU 80 calculates the total power consumption and, in accordance with the priorities, causes operations of the long-term large power loads D and E to pause (at time t3). At time t6, when the pause duration T4 has passed, the ECU 80 causes operation of the long-term large power load D to restart. Then, at time t7, when the pause duration T5 has passed, the ECU 80 causes operation of the long-term large power load E to restart.

Operation of the long-term large power load C is started by control by the ECU 80 and the power consumption thereof is at a maximum at time t2, and the operation is stopped at time t10. The long-term large power load D starts operation and the power consumption thereof is at a maximum at time t2, and the operation is paused at time t3. The long-term large power load D restarts operation and the power consumption thereof is at a maximum at time t6, and the operation is stopped at time t11. The duration from time t3 to time t6 corresponds to the pause duration T4.

The long-term large power load E starts operation and the power consumption thereof is at a maximum at time t2, and the operation is paused at time t3. The long-term large power load E restarts operation and the power consumption thereof is at a maximum at time t7, and the operation is stopped at time t12. The duration from time t3 to time t7 corresponds to the pause duration T5 (>T4).

The small power load F starts operation and the power consumption thereof is at a maximum at time t1, and the operation is stopped at time t13. The small power load G starts operation and the power consumption thereof is at a maximum at time t1, and the operation is stopped at time t14.

As described above, when the total power consumption would exceed the threshold K, based on the priorities, the ECU 80 selects the small power loads F and G and the long-term large power load C for approval. Hence, the approved small power loads F and G and long-term large power load C continue operations, but the long-term large power loads D and E that are not approved pause operations. When the total power consumption is less than or equal to the threshold K, the ECU 80 allows the operating small power loads F and G and long-term large power loads C, D and E to continue operations. Thus, because the long-term large power loads D and E pause operations when the total power consumption would exceed the threshold K, the total power consumption does not exceed the threshold K. Therefore, a voltage drop of the high-voltage battery 42 and the auxiliary battery 44 (see FIG. 1) may be suppressed.

The ECU 80 assigns ranks to the small power loads 22 and the long-term large power loads 24. Hence, because the priorities are decided based on the ranks, which power loads to pause may be determined even if the small power loads 22 and long-term large power loads 24 are operating with similar power consumptions.

In the ECU 80, the pause duration T4 of the long-term large power load D with a higher rank is shorter than the pause duration T5 of the long-term large power load E with a lower rank. Therefore, of the long-term large power loads D and E whose operations are paused, operation of the long-term large power load D with the higher rank is restarted earlier. Therefore, a situation in which, among the long-term large power loads D and E whose operations are paused, an operation duration of the long-term large power load with lower necessity is longer may be suppressed. Thus, necessary power loads may be operated efficiently.

In the ECU 80, the restart of operation of the long-term large power load E with the lower priority is delayed relative to the restart of operation of the long-term large power load D with the higher priority. Therefore, the long-term large power loads D and E whose operations have been paused do not restart operations at the same time. Thus, a temporary increase in power consumption may be suppressed.

In the ECU 80, when the total power consumption would exceed the threshold K, among the small power loads F and G and the long-term large power loads C, D and E, the small power loads F and G and the long-term large power load C continue operations but the long-term large power loads D and E pause operations. Consequently, power consumption is reduced compared to a situation in which the long-term large power loads D and E continue operations. Therefore, even if the power consumption of any of the operating small power loads F and G, long-term large power loads C, D and E and short-term large power loads A and B temporarily increases, the total power consumption may be prevented from exceeding the threshold K.

Third Exemplary Embodiment

Now, an ECU 90 that serves as an example of an arbitration device according to a third exemplary embodiment is described. The ECU 90 is provided in the vehicle 10 in place of the ECU 60 (see FIG. 1). Apart from the ECU 90, structures of the vehicle 10 according to the third exemplary embodiment are similar to structures according to the second exemplary embodiment. Structures that are basically the same as in the ECU 80 (see FIG. 9) are assigned the same reference symbols as in the ECU 80 and are not described here.

Figure 12:
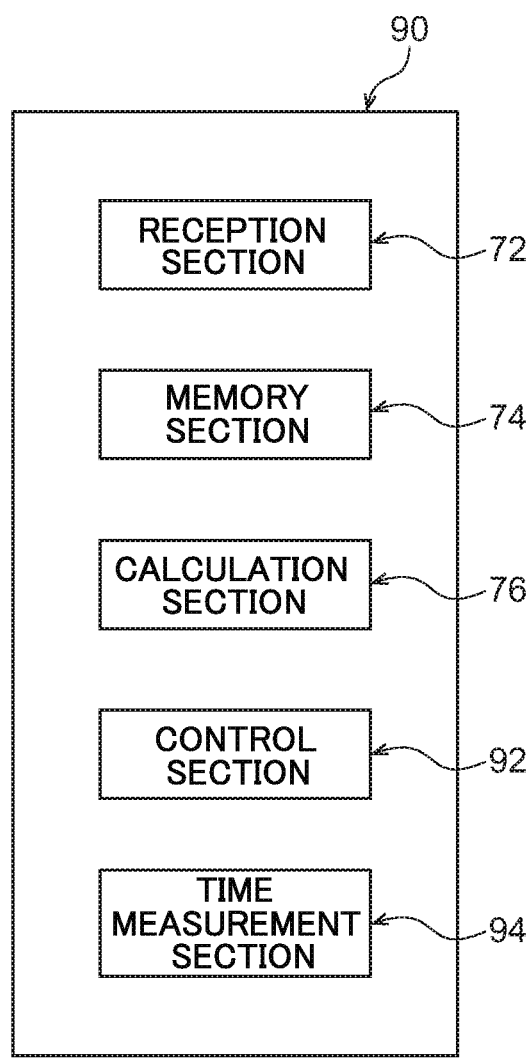
FIG. 12 is a block diagram showing an example of functional structures of an ECU according to a third exemplary embodiment.

As functional structures, the ECU 90 shown in FIG. 12 includes the reception section 72, the memory section 74, the calculation section 76, a control section 92 and a time measurement section 94. The functional structures are realized by the CPU 62 (see FIG. 2) reading and executing a power control program memorized in the ROM 64 or storage 68 (see FIG. 2).

Similarly to the second exemplary embodiment, a total power consumption is calculated by summing a summed power consumption of the short-term large power loads A and B, a summed power consumption of the long-term large power loads C, D and E, and a summed power consumption of the small power loads F and G. Where the two short-term large power loads 32, three long-term large power loads 24 and two small power loads 22, respectively, are to be distinguished in the following descriptions, the reference symbols A to G are assigned thereto. However, where there is no need to distinguish the same, the power loads are recited as the short-term large power loads 32, the long-term large power loads 24 and the small power loads 22.

The time measurement section 94 measures respective operation durations of the long-term large power loads C, D and E and the small power loads F and G. More specifically, for each of the long-term large power loads C, D and E and small power loads F and G, the time measurement section 94 measures a duration passing from an operation start time to whichever is earlier of operation start notice times of the short-term large power loads A and B; these passing durations are used as operation durations.

When the total power consumption would exceed the threshold K, the control section 92 selects which of the small power loads 22 and long-term large power loads 24 to approve based on the priorities, and causes the power loads among the operating small power loads 22 and long-term large power loads 24 that are not approved to pause operations. When the total power consumption is less than or equal to the threshold K, the control section 92 allows the operating small power loads 22 and long-term large power loads 24 to continue operations.

At the control section 92, respective ranks are assigned to the plural small power loads 22 and the plural long-term large power loads 24, and the priorities are decided based on the ranks. When respective operations of the plural small power loads 22 and the plural long-term large power loads 24 are to be paused, the control section 92 specifies pause durations based on the ranks. Power loads with higher ranks are specified with shorter pause durations than power loads with lower ranks.

Of the plural small power loads 22 and plural long-term large power loads 24 whose operations are paused, the control section 92 restarts operation of each at a delayed time relative to a power load with a higher priority. The control section 92 sets the small power loads 22 to higher priorities than the long-term large power loads 24.

In addition, the control section 92 sets the small power loads 22 and long-term large power loads 24 with shorter operation durations as measured by the time measurement section 94 to higher priorities than the small power loads 22 and long-term large power loads 24 with longer operation durations as measured by the time measurement section 94.

FIG. 13 shows ranks, specified priorities, modified priorities, specified pause durations, modified pause durations, operation durations, operation decisions and restart priorities for the small power loads F and G and the long-term large power loads C, D and E. The two short-term large power loads A and B are simply shown as being separate. The ranks are specified in advance at the memory section 74. The operation durations are durations measured by the time measurement section 94. The specified priorities, modified priorities, specified pause durations, modified pause durations, operation decisions and restart priorities are decided by the ECU 90 based on the modified priorities. The orders of ranks and priorities are similar to the first and second exemplary embodiments. The smaller the number representing a pause duration, the shorter the duration.

The meaning of the term "specified priorities" is intended to include priorities specified by the ECU 90 in rank order. The meaning of the term "modified priorities" is intended to include priorities that have been modified by the ECU 90 referring to the operation durations of the power loads and re-specifying the priorities. The meaning of the term "modified pause durations" is intended to include pause durations that have been modified by the ECU 90 referring to the operation durations of the power loads and re-specifying the pause durations. The ECU 90 modifies the priorities so as to give power loads with shorter operation durations higher priorities than power loads with longer operation durations. Then, for power loads with higher modified priorities, the ECU 90 specifies shorter modified pause durations and higher restart priorities for when the operations thereof are paused.

For example, the long-term large power load C has rank C, specified priority 3, modified priority 5, specified pause duration T3, modified pause duration T5, operation duration Te, operation decision "pause", and restart priority 2. The long-term large power load D has rank D, specified priority 4, modified priority 3, specified pause duration T4, modified pause duration T3, operation duration Tc, and operation decision "continue". The long-term large power load E has rank E, specified priority 5, modified priority 4, specified pause duration T5, modified pause duration T4, operation duration Td, operation decision "pause", and restart priority 1. The small power load F has rank A, specified priority 1, modified priority 1, specified pause duration T1, modified pause duration T1, operation duration Ta, and operation decision "continue". The small power load G has rank B, specified priority 2, modified priority 2, specified pause duration T2, modified pause duration T2, operation duration Tb, and operation decision "continue". For example, Ta=Tb<Tc<Td<Te.

—Operation and Effects—

Now, operation of the ECU 90 according to the third exemplary embodiment (see FIG. 12) is described using FIG. 14. FIG. 14 depicts changes in the power consumptions of the power loads whose power is controlled by the ECU 90. See the drawings of FIG. 1, FIG. 2 and FIG. 12 for the respective parts of the vehicle 10 including the ECU 90; specific figure numbers are omitted in this description. The times t shown in FIG. 14 are different from the times t in FIG. 7, FIG. 8 and FIG. 11.

The graph G12 represents changes in the power consumption of the short-term large power load A, the graph G13 represents changes in the power consumption of the short-term large power load B, the graph G14 represents changes in the power consumption of the long-term large power load C, the graph G15 represents changes in the power consumption of the long-term large power load D, the graph G16 represents changes in the power consumption of the long-term large power load E, the graph G17 represents changes in the power consumption of the small power load F, and the graph G18 represents changes in the power consumption of the small power load G. For each graph, the horizontal axis represents time and the vertical axis represents power consumption.

The short-term large power load A starts operation and the power consumption thereof is at a maximum at time t6, and the operation is stopped at time t10. The short-term large power load B starts operation and the power consumption thereof is at a maximum at time t7, and the operation is stopped at time t11. Although not shown in the drawing, operation start notice information is sent from both the short-term large power load A and the short-term large power load B prior to time t6.

The ECU 90 specifies the priorities based on the specified ranks. When the total power load does not exceed the threshold K, the ECU 90 approves operations of the long-term large power loads C, D and E and the small power loads F and G for which inputs of operation request information have been received prior to time t1. The ECU 90 measures operation durations starting from the operation start times of the long-term large power loads C, D and E and small power loads F and G.

In this example, the ECU 90 receives an input of operation notice information from the short-term large power load A or B between time t4 and time t5 (i.e., a time prior to time t6). The ECU 90 modifies the priorities of power loads with shorter operation durations up to this time to higher priorities. More specifically, because Tc<Td<Te (see FIG. 13), the ECU 90 modifies the priority of the long-term large power load D from 4 to 3, modifies the priority of the long-term large power load E from 5 to 4, and modifies the priority of the long-term large power load C from 3 to 5.

Then, the ECU 90 calculates a total power consumption and, in accordance with the modified priorities, causes the long-term large power loads C and E to pause operations (at time t5). The ECU 90 allows the long-term large power load D to continue operation. At time t8, after the pause duration T4 has passed, the ECU 90 causes the long-term large power load E to restart operation. At time t9, after the pause duration T5 has passed, the ECU 90 causes the long-term large power load C to restart operation.

Operation of the long-term large power load C is started by control by the ECU 90 and the power consumption thereof is at a maximum at time t2, the operation is paused at time t5, the operation is restarted and the power consumption is at a maximum at time t9, and the operation is stopped at time t14. Operation of the long-term large power load D is started and the power consumption thereof is at a maximum at time t4, and the operation is stopped at time t12. Operation of the long-term large power load E is started and the power consumption thereof is at a maximum at time t3, the operation is paused at time t5, the operation is restarted and the power consumption is at a maximum at time t8, and the operation is stopped at time t13.

Operation of the small power load F is started and the power consumption thereof is at a maximum at time t1, and the operation is stopped at time t15. Operation of the small power load G is started and the power consumption thereof is at a maximum at time t1, and the operation is stopped at time t16.

As described above, when the total power consumption would exceed the threshold K, the ECU 90 selects the small power loads F and G and the long-term large power load D for approval based on the priorities. Hence, the approved small power loads F and G and long-term large power load D continue operations, but the long-term large power loads C and E that are not approved pause operations. When the total power consumption is less than or equal to the threshold K, the ECU 90 allows the operating small power loads F and G and long-term large power loads C, D and E to continue operations. Thus, because the long-term large power loads C and E pause operations when the total power consumption would exceed the threshold K, the total power consumption does not exceed the threshold K. Therefore, a voltage drop of the high-voltage battery 42 and the auxiliary battery 44 (see FIG. 1) may be suppressed.

The ECU 90 assigns ranks to the small power loads 22 and the long-term large power loads 24. Hence, because the priorities are decided based on the ranks, which power loads to pause may be determined even if the small power loads 22 and the long-term large power loads 24 are operating with similar power consumptions.

In the ECU 90, of the long-term large power loads C and E whose operations are paused, the long-term large power load E with the shorter operation duration restarts operation earlier than the long-term large power load C with the longer operation duration. Therefore, a difference in operation durations between the long-term large power loads C and E may be reduced, and a situation in which an operation duration of the long-term large power load E alone is shortened may be suppressed.

The ECU 90 restarts operation of the long-term large power load C with the lower modified priority at a delayed time relative to the restart of operation of the long-term large power load E with the higher modified priority. Therefore, the long-term large power loads C and E whose operations have been paused do not restart operations at the same time. Thus, a temporary increase in power consumption may be suppressed.

In the ECU 90, when the total power consumption would exceed the threshold K, among the small power loads F and G and the long-term large power loads C, D and E, the small power loads F and G and the long-term large power load D continue operations but the long-term large power loads C and E pause operations. Consequently, power consumption is reduced compared to a situation in which the long-term large power loads C and E continue operations. Therefore, even if the power consumption of any of the operating small power loads F and G, long-term large power loads C, D and E and short-term large power loads A and B temporarily increases, the total power consumption may be prevented from exceeding the threshold K.

The present disclosure is not limited by the exemplary embodiments described above. Variant examples are described below. Structures that are basically the same as structures in the first, second and third exemplary embodiments are assigned the same reference symbols and are not described here.

Variant Examples

Figure 15:
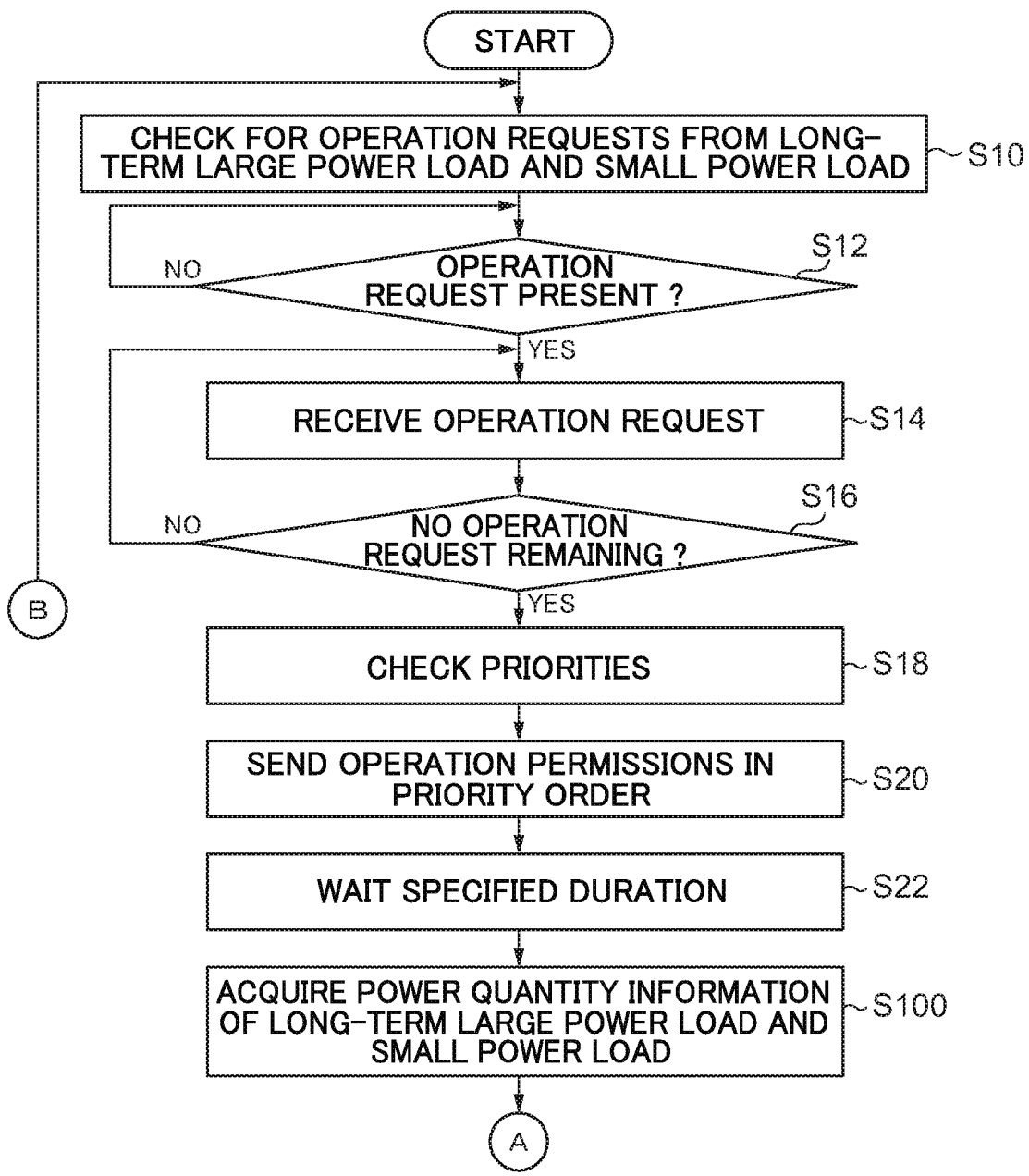
FIG. 15 is a former part of a flowchart showing a flow of power control processing at an ECU according to a variant example of the first exemplary embodiment.
Figure 16:
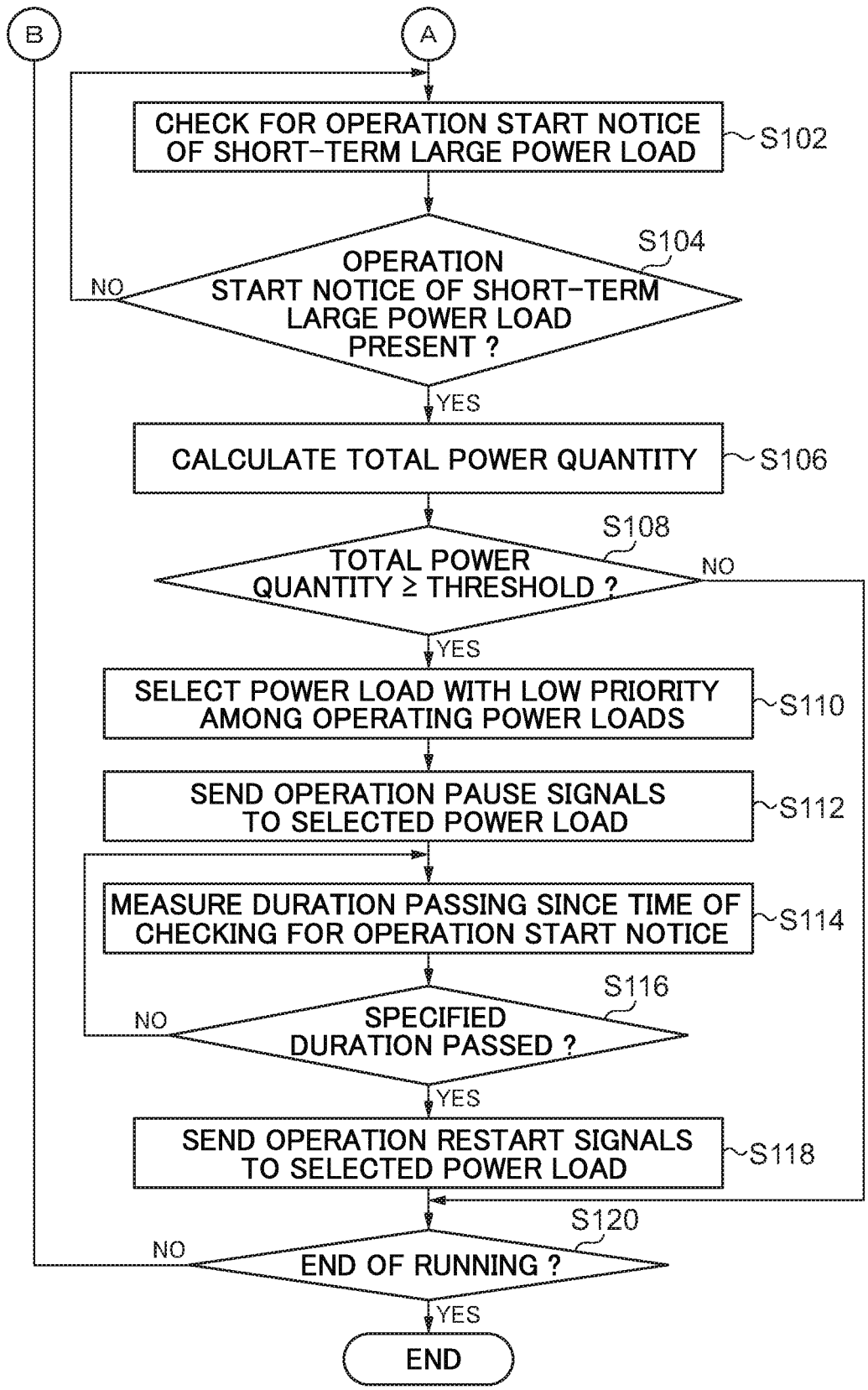
FIG. 16 is a latter part of the flowchart showing the flow of power control processing at the ECU according to the variant example of the first exemplary embodiment.

FIG. 15 and FIG. 16 show a flow of processing at the ECU 60 according to the first exemplary embodiment (see FIG. 2) that causes the small power load 22 and long-term large power load 24 to operate in priority order prior to operation notice information being inputted from the short-term large power load 32 (see FIG. 2). Steps that are the same as in the processing shown in FIG. 5 are assigned the same numbers and are not described here.

In step S10, the CPU 62 (see FIG. 2) checks for operation requests from the long-term large power load 24 and the small power load 22. Then the CPU 62 proceeds to step S12.

In step S12, the CPU 62 makes a determination as to whether an operation request is present. If an operation request is present, the CPU 62 proceeds to step S14. If there is no operation request, the CPU 62 repeats step S12.

In step S14, the CPU 62 starts reception of operation requests. Then the CPU 62 proceeds to step S16.

In step S16, the CPU 62 makes a determination as to whether an operation request remains to be received. If there are no operation requests remaining to be received, the CPU 62 proceeds to step S18. If there is a remaining operation request to be received, the CPU 62 repeats steps S14 and S16.

In step S18, the CPU 62 checks the priorities of the long-term large power load 24 and small power load 22 for which operation requests have been received. Then the CPU 62 proceeds to step S20.

In step S20, the CPU 62 sends operation permissions in priority order starting from the highest priority. Then the CPU 62 proceeds to step S22.

In step S22, the CPU 62 waits for a pre-set specified duration. Then the CPU 62 proceeds to step S100. Thus, in a situation other than pausing, the CPU 62 causes the small power load 22 and long-term large power load 24 to operate in accordance with the priorities.

Alternative Variant Examples

In the first exemplary embodiment, the priorities may be specified in advance without ranks being specified. In the first exemplary embodiment, the small power load 22 may be set to a lower priority than the long-term large power load 24.

In the second exemplary embodiment, the priorities may be specified in advance without ranks being specified. In the second exemplary embodiment, a power load with a higher rank may be set to a longer pause duration than a power load with a lower rank. In the second exemplary embodiment, if the total power load would not exceed the threshold K, plural power loads that have paused operations may restart operations at the same time. In the second exemplary embodiment, the small power loads 22 may be set to lower priorities than the long-term large power loads 24 and operations of the small power loads 22 may be paused.

In the third exemplary embodiment, the priorities may be specified in advance without ranks being specified. In the third exemplary embodiment, the priority of a power load with a shorter operation duration may be set lower than the priority of a power load with a longer operation duration. In the third exemplary embodiment, if the total power load would not exceed the threshold K, plural power loads that have paused operations may restart operations at the same time. In the third exemplary embodiment, the small power loads 22 may be set to lower priorities than the long-term large power loads 24 and operations of the small power loads 22 may be paused.

The number of the short-term large power loads 32 is not limited to one or two but may be three or more. The number of the small power loads 22 is not limited to one or two but may be three or more. The number of the long-term large power loads 24 is not limited to one or three but may be two, four or more.

Operation start times and stop (operation end) times of the small power load(s) 22, long-term large power load(s) 24 and short-term large power load(s) 32 may be specified as different times from the respective times mentioned above.

The first power load is not limited to two classes—the small power load 22 and the long-term large power load 24. There may be a single first power load or the first power load may be in three or more classes. The second power load is not limited to a single class—the short-term large power load 32. The second power load may be in two or more classes.

The method of calculating the total power consumption at the calculation section 76 is not limited to a method of reading and calculating information that has been memorized at the memory section 74 in advance (information corresponding to the graphs). For example, a sensing section that senses the power consumption of each power load in real time may be provided, information about power consumptions sensed by the sensing section may be memorized at the memory section 74, and the total power consumption may be calculated based on this power consumption information. The sensing of power consumption by this sensing section may employ one or both of a current sensing technique and a voltage sensing technique.

It is preferable if operation starts and operation pauses of the respective power loads are transmitted promptly in accordance with a communications protocol, in frames with a relatively short cycle or the like.

The power control processing that, in the exemplary embodiments described above, is executed by the CPU 62 reading software (a program) may be executed by various kinds of processor other than the CPU 62. Examples of processors in these cases include a PLD (programmable logic device) in which a circuit configuration can be modified after manufacturing, such as an FPGA (field-programmable gate array) or the like, a dedicated electronic circuit which is a processor with a circuit configuration that is specially designed to execute specific processing, such as an ASIC (application-specific integrated circuit) or the like, and so forth. The power control processing may be executed by one of these various kinds of processors, and may be executed by a combination of two or more processors of the same or different kinds (for example, plural FPGAs, a combination of a CPU and an FPGA, or the like). Hardware structures of these various kinds of processors are, to be more specific, electronic circuits combining circuit components such as semiconductor components and the like.

In the exemplary embodiments described above, modes are described in which the power control program is memorized in advance (installed) at the ROM 64 or the storage 68, but this is not limiting. The program may be provided in a mode recorded on a recording medium, such as a CD-ROM (compact disc read-only memory), DVD-ROM (digital versatile disc read-only memory), USB (universal serial bus) memory or the like. Modes are also possible in which the power control program is downloaded from external equipment via a network.

What is claimed is:

1. An arbitration device that arbitrates operation requests from a plurality of first power loads in a vehicle,
   the vehicle including:
   the plurality of first power loads, each of which outputs operation request information prior to operating and operates after an operation request is approved;
   at least one second power load that outputs operation notice information prior to operating and operates regardless of approval; and
   a power supply that supplies electric power to the first power loads and the at least one second power load, and
   the arbitration device comprising:
   a reception section that receives inputs of the operation request information and the operation notice information;

a memory section that stores first power consumptions of the first power loads and a second power consumption of each second power load;

a calculation section that:
reads from the memory section the first power consumption of each first power load from which the operation request information has been inputted to the reception section,
reads from the memory section the second power consumption of each second power load from which the operation notice information has been inputted to the reception section, and
calculates a total power consumption combining each first power consumption read from the memory section and each second power consumption read from the memory section; and a control section at which
respective ranks are assigned to the plurality of first power loads;
priorities of the plurality of first power loads are decided based on the ranks; and
for each of the plurality of first power loads, a pause duration for which operation of each first power load is paused is specified based on the respective rank, the pause duration being shorter for a first one of the first power loads with a first rank than for a second one of the first power loads with a second rank lower than the first rank, wherein when the total power consumption exceeds a threshold, the control section selects which of the first power loads to approve based on the priorities and causes each operating first power load that is not approved to pause operation, and, when the total power consumption is less than or equal to the threshold, the control section allows each first power load currently operating to continue operation.

2. The arbitration device according to claim 1, further comprising a time measurement section that measures respective operation durations of the plurality of first power loads, wherein, the first one of the plurality of the first power loads has a first operation duration measured by the time measurement section, the second one of the plurality of the first power loads has a second operation duration measured by the time measurement section shorter than the first operation duration, and in preference to the ranks of the first power loads, the control section sets a priority of the first one of the plurality of the first power loads to be lower than a priority of the second one of the plurality of the first power loads.

3. The arbitration device according to claim 1, wherein the control section causes the second one of the plurality of the first power loads having operations that have been paused to restart operation at a delayed time relative to the first one of the plurality of the first power loads.

4. The arbitration device according to claim 1, wherein, at the control section, the first power loads are classified as a first type of the first power and a second type of the first power loads with a larger power consumption than the first type of the first power loads, and the control section sets the first type of the first power loads to a higher priority than the second type of the first power loads.

5. The arbitration device according to claim 1, wherein:
the first one of the first power loads and the second one of the first power loads has a power consumption during operation that is larger than the first one of the first power loads, and the at least one second power load includes a first one power load with a a third power consumption during operation larger than the first one of the first power loads, the first one of the at least one second power load operating for a shorter period than the second one of the first power loads.

* * * * *